US009982325B2

(12) United States Patent
Duyvesteyn

(10) Patent No.: US 9,982,325 B2
(45) Date of Patent: May 29, 2018

(54) SYSTEMS AND METHODOLOGIES FOR DIRECT ACID LEACHING OF SCANDIUM-BEARING ORES

(71) Applicant: Scandium International Mining Corporation, Sparks, NV (US)

(72) Inventor: Willem P. C. Duyvesteyn, Reno, NV (US)

(73) Assignee: Scandium International Mining Corp., Sparks, NV (US)

( * ) Notice: Subject to any disclaimer, the term of this patent is extended or adjusted under 35 U.S.C. 154(b) by 170 days.

(21) Appl. No.: 14/933,559

(22) Filed: Nov. 5, 2015

(65) Prior Publication Data

US 2016/0153070 A1   Jun. 2, 2016

Related U.S. Application Data

(60) Provisional application No. 62/075,495, filed on Nov. 5, 2014.

(51) Int. Cl.
*C22B 3/04*    (2006.01)
*C22B 3/44*    (2006.01)
*C22B 59/00*   (2006.01)
*C22B 3/08*    (2006.01)
*C21B 15/00*   (2006.01)
*C22B 3/26*    (2006.01)

(52) U.S. Cl.
CPC ............. *C22B 59/00* (2013.01); *C21B 15/00* (2013.01); *C22B 3/0005* (2013.01); *C22B 3/04* (2013.01); *C22B 3/08* (2013.01); *C22B 3/44* (2013.01); *Y02P 10/234* (2015.11)

(58) Field of Classification Search
CPC .............. C22B 59/00; C22B 3/04; C22B 3/44
See application file for complete search history.

(56) References Cited

U.S. PATENT DOCUMENTS

| 3,711,032 | A | 1/1973 | Weston |
| 5,756,056 | A | 5/1998 | Kimura et al. |
| 6,312,500 | B1 * | 11/2001 | Duyvesteyn ............ C22B 1/243 |
| | | | 75/712 |
| 8,016,913 | B2 | 9/2011 | Drinkard, Jr. |
| 8,366,801 | B2 | 2/2013 | Chamberlain et al. |

(Continued)

FOREIGN PATENT DOCUMENTS

JP     2014177391 A  *  9/2014
WO  WO 2015021926 A1 *  2/2015

OTHER PUBLICATIONS

Botsis, Nicole, Wilhelm Van Bronswijk, and Helen Watling. "Sequential Leaching of Nickel Laterite Ores." ALTA 2011 Nickel/Cobalt/Copper Conference (2011): pp. 1-5, 92-106. Proceedings of Nickel-Cobalt-Copper Sessions at ALTA 2011. Alta Metallurgical Services. Web. Aug. 16, 2017.*

(Continued)

*Primary Examiner* — George Wyszomierski
*Assistant Examiner* — Tima M McGuthry Banks
(74) *Attorney, Agent, or Firm* — John A. Fortkort; Fortkort & Houston PC

(57) ABSTRACT

Methods are provided for the recovery of scandium from scandium-bearing ores. The methods included leaching under atmospheric conditions using various acids. Solution impurities are removed from the leachate and scandium values are then recovered from the leachate.

28 Claims, 15 Drawing Sheets

(56) References Cited

U.S. PATENT DOCUMENTS

| | | | | |
|---|---|---|---|---|
| 2011/0272508 | A1* | 11/2011 | Krebs | C22B 1/00 241/30 |
| 2012/0204680 | A1 | 8/2012 | Duyvesteyn | |
| 2012/0207656 | A1* | 8/2012 | Duyvesteyn | C22B 1/04 423/21.1 |
| 2013/0288330 | A1 | 10/2013 | Konishi et al. | |
| 2014/0314639 | A1* | 10/2014 | Mihaylov | C22B 59/00 423/21.1 |

OTHER PUBLICATIONS

Du et al. CN 103468979 A, in the patent family including WO 2015021926 AI, published Feb. 19, 2015. Abstract.*
Liang, Shu-Chuan et al.; "Enrichment of Traces of Scandium from Aqueous Solutions by Means of Flotation"; Analytical Chem; 1984; one page.
Yianatos, J.B.; "Column Flotation Modelling and Technology"; International Collequium: Developments in Froth Flotation; vol. 2, Cape Town South Africa, Aug. 3-4, 1989; 31 pages.
Agacayak, T. and Zedef, V.; "Dissolution kinetics of a lateritic nickel ore in sulphuric acid medium"; Acta Montanistica Slovaca; 17(2012); pp. 33-41.
Guo, Xue-yi et al.; "Leaching behavior of metals from limonitic laterite ore by high pressure acid leaching"; www.sciencedirect.com; Trans. Nonferrous Met. Soc. China 21(2011); pp. 191-195.
Mbaya, R.K.K. et al.; "Atmospheric pressure leaching application for the recovery of copper and nickel from low-grade sources"; The Southern African Institute of Mining and Metallurgy Base Metals Conference; 2013; 14 pages.
Sheedy, M. et al.; "Acid Separation for Impurity Control and Recycle Using Short Bed Ion Exchange"; T.T. Chen Honorary Symposium on Hydrometallurgy, Electrometallurgy and Materials Characterization; 2012; 13 pages.
ALS Metallurgy product brochure; "Flotation Testwork From Bench Scale to Pilot Scale"; four pages.
Biley, C.A. et al.; "Development of the iron-focused laterite (ARFe) process"; The Southern African Institute of Mining and Metallurgy Base Metals Conference; 2013; 10 pages.
McDonald, R.G. et al.; "Atmospheric acid leaching of nickel laterites review Part I. Sulphuric acid technologies"; www.sciencedirect.com; Hydrometallurgy 91 (2008); 19 pages.
Van Huet, Sanja et al.; NI43-101 Technical Report on the Nyngan Gilgai Scandium Project:; Jervoic Mining Limited, Nyngan, New South Wales, Australia; Mar. 25, 2010; 50 pages.
Froth flotation; Wikipedia; Nov. 1, 2015; 14 pages.
Ma, Mark; "Froth Flotation of Iron Ores"; Scientific & Academic Publication; International Journal of Mining Engineering and Mineral Processing; 2012; 1(2):56-61.
Praes, P. E. et al.; "Recovery of Iron Ore Tailings by Column Flotation"; Journal of Minerals and Materials Characterization and Engineering; 2013, 1, 212-216.
Taylor, Alan; "Laterites—Still a Frontier of Nickel Process Development"; TMS 2013 Annual Meeting and Exhibition; Mar. 3-7, 2013; San Antonio, Texas; 41 pages.
Quasi, Keith et al.; "Preconcentration strategies in the processing of nickel laterite ores part 3: Flotation testing"; www.elsevier.com; Minerals Engineering; Apr. 8, 2015; eight pages.
Thubakgale, C.K. et al.; "A study of atmospheric acid leaching of a South African nickel laterite"; www.elsevier.com; Minerals Engineering; 2013; three pages.
Fuerstenau, M.C. et al.; "Selective Flotation of Iron Oxide"; Transactions; Jun. 1967; four pages.
Dobby, Glenn; "Column Flotation"; SGS Minerals Services; Technical Paper 2002-23; 10 pages.
Sheedy, Michael; "Recoflo Ion Exchange Technology"; Prosep Technologies, Inc. a subsidiary of Eco-Tec Ltd.; Proceedings of the TMS Annual Meeting, 1998, San Antonio, Texas; 13 pages.
Lamya, R.M. and Lorenzen, L.; "Atmospheric acid leaching of nickel-copper matte from Impala Platinum Refineries"; Journal of the South African Institute of Mining and Metallurgy; vol. 106; Jun. 2006; 12 pages.

* cited by examiner

9,982,325 B2

SYSTEMS AND METHODOLOGIES FOR DIRECT ACID LEACHING OF SCANDIUM-BEARING ORES

CROSS-REFERENCE TO RELATED APPLICATION

This application claims the benefit of priority from U.S. provisional application No. 62/075,495, filed Nov. 5, 2014, having the same title, the same inventor, and which is incorporated herein by reference in its entirety.

FIELD OF THE DISCLOSURE

The present disclosure relates generally to systems and methods for recovering scandium values from scandium-bearing ores, and more particularly to such systems and methods which utilize direct acid leaching of such ores.

BACKGROUND OF THE DISCLOSURE

Although scandium was discovered in 1879, for much of its history, this element has been a commercially insignificant metal with few practical uses. More recently, however, scandia-stabilized zirconia has gained importance as a high efficiency electrolyte in solid oxide fuel cells, while scandium oxide (scandia or $Sc_2O_3$) is used to make high intensity discharge lamps. Scandium has also attracted interest in various aerospace applications, as demonstrated by its use in the MiG-21 and MiG-29 aircraft.

Scandium alloys offer numerous advantages over other metal alloys in various applications. For example, scandium-reinforced alloys are much stronger than other high-strength alloys, exhibit significant grain refinement, strengthen welds, and eliminate hot cracking in welds. Scandium alloys also exhibit good resistance to corrosion.

Scandium-aluminum alloys are of particular commercial interest, since these alloys exhibit a lower specific gravity compared to the more widely used titanium aluminum alloys. Thus, for example, Sc—Al has a specific gravity of 2.8 compared to 4.5 for $Ti_6Al_4V$. In a commercial airline fleet, this difference in specific gravity translates into substantial fuel savings over the course of a year.

Despite the many advantages offered by scandium and its alloys, the widespread use of scandium has been hampered by the low availability (and consequently high cost) of the metal. Although scandium is not a particularly rare metal in terms of its abundance in the Earth's crust, there are currently no known, easily extractable deposits of minerals which contain high concentrations of the metal. Consequently, most scandium today is obtained as a byproduct of other metal recovery processes, typically from the treatment of tailings or metal sludges obtained from the refining of other metals. For example, scandium is frequently recovered as a byproduct of the treatment of tungsten and uranium tailings, or from waste streams resulting from the processing of titanium-containing ores and concentrates into titanium dioxide pigments. Scandium can also be obtained from the treatment of red mud (a waste product of the Bayer process used to refine bauxite into alumina).

SUMMARY OF THE DISCLOSURE

In one aspect, a method is provided for recovering scandium values from laterite ores. The method comprises (a) providing a scandium-bearing laterite ore which includes a kaolinite ($Al_2Si_2O_5(OH)_4$) phase and a goethite (FeOOH) phase; (b) separating the goethite phase from the kaolinite phase, thereby producing an isolated goethite phase; (c) subjecting the isolated goethite phase to leaching, thereby producing a leachate; and recovering scandium values from the leachate.

In another aspect, a method is provided for recovering scandium values from laterite ores. The method comprises (a) providing a scandium-bearing laterite ore from an ore formation containing a limonite fraction, a saprolite fraction and a bedrock fraction, wherein said limonite fraction includes kaolinite and goethite phases, and wherein the goethite phase is a scandium-bearing phase; (b) separating the limonite fraction from the saprolite fraction and the bedrock fraction, thereby producing a separated limonite fraction; (c) subjecting the separated limonite fraction to atmospheric pressure acid leaching, thereby producing a first scandium-bearing, acidic solution; (d) increasing the pH of the first solution to produce a second, scandium-bearing solution; and (e) recovering scandium values from the second solution.

In a further aspect, a method is provided for recovering scandium values from scandium-bearing ores. The method comprises (a) providing a scandium-bearing ore; (b) subjecting the scandium-bearing ore to atmospheric pressure acid leaching with sulfuric acid, thereby producing a first, scandium bearing solution containing ferric ($Fe^{3+}$) ions; (c) subjecting the first solution to hydrothermal processing, thereby precipitating hematite or a basic iron sulfate from the first solution and generating a second, scandium-bearing solution; and (d) recovering scandium values from the second solution.

In another aspect, a method is provided for recovering scandium values from scandium-bearing ores. The method comprises (a) providing a scandium-bearing ore; (b) subjecting the scandium-bearing ore to atmospheric pressure acid leaching with sulfuric acid, thereby producing a first, scandium-bearing solution containing ferric ($Fe^{3+}$) ions; (c) subjecting the first solution to a process called "acid retardation", thus obtaining (i) a second solution which is rich in Sc and ferric ions compared to the first solution, and (ii) a third solution which is rich in acid compared to the first solution.

In still another aspect, a method is provided for recovering scandium values from scandium-bearing ores. The method comprises (a) providing a scandium-bearing ore; (b) subjecting the scandium-bearing ore to atmospheric pressure acid leaching with sulfuric acid, thereby producing a first, scandium-bearing solution containing ferric ($Fe^{3+}$) ions; and (c) precipitating an acid iron sulfate such as rhomboclase from the first solution, thereby obtaining a second solution in which the concentration of ferric ions is reduced as compared to the first solution.

In yet another aspect, a method is provided for recovering scandium values from laterite ores containing scandium and other scandium bearing ores. The method comprises (a) providing a scandium-bearing ore from the saprolite fraction of an ore deposit; (b) pelletizing the ore from the saprolite fraction; (c) treating the pelletized ore from the saprolite fraction with sulfuric acid, thereby obtaining a treated ore; (d) irrigating the treated ore from the saprolite fraction with a leachate, thereby forming a pregnant leachate; and (e) recovering scandium values from the pregnant leachate.

In another aspect, a method is provided for recovering scandium values from laterite ores. The method comprises (a) providing a first portion of a scandium-bearing laterite ore from the limonite fraction of an ore deposit; (b) leaching the first portion of ore with a leachate in an agitated tank, thereby forming a first pregnant leachate, wherein the leaching step is performed at a temperature of at least 95° C. with an acid to ore ratio of at least 0.6 tons of acid per ton of ore, and with a leaching time of at least 4 hours; and (c) recovering scandium values from the pregnant leachate.

In a further aspect, a method is provided for recovering scandium values from a scandium-bearing feedstock. The method comprises (a) leaching the scandium-bearing feedstock with a solution comprising about 10% to about 90% by weight of nitric acid; (b) heating the resulting leachate to a temperature within the range of about 125° C. to about 200° C., thereby forming a precipitate and a liquid medium; (c) separating the precipitate from the liquid medium; and (d) recovering scandium values from the liquid medium.

In still another aspect, methods are provided for recovering scandium from the solutions and leachates obtained in the foregoing methods through suitable acid baking.

In yet another aspect, a method is provided for recovering scandium, niobium and titanium values from oxidized ores. The method comprises (a) providing a portion of ground ore which contains Sc, Nb, Fe, and at least one other metal selected from the group consisting of Al, Ti, Ca and Mg, wherein the number of moles of Sc, Nb, Fe, Al, Ti, Ca and Mg present in the ore is $m_{Sc}$, $m_{Nb}$, $m_{Fe}$, $m_{Al}$, $m_{Ti}$, $m_{Ca}$ and $m_{Mg}$, respectively, and wherein the ore contains at least 20% Fe by weight, based on the total weight of the ore; (b) mixing the portion of ore with an acid selected from the group consisting of hydrochloric acid, sulfuric acid and nitric acid, thereby obtaining an acidified ore, wherein the amount of acid mixed with the ore is sufficient to react with the scandium, niobium, titanium and calcium oxides in the ore, but is insufficient to react with all of the metal oxides in the ore; (c) forming iron oxide and sulfates of scandium, niobium and titanium in the acidified ore by heating the acidified ore in a reactor at a temperature within the range of about 200° C. to about 800° C. and preferably 450° C. to about 800° C., thereby obtaining a heat processed ore; (d) leaching scandium, niobium and titanium values from the heat processed ore with acidified water, thereby obtaining a leachate; and (e) recovering (preferably separately) scandium, niobium and titanium values from the leachate.

In another aspect, a method is provided for recovering scandium values from scandium-bearing ores. The method comprises (a) providing a scandium-bearing ore; (b) subjecting the scandium-bearing ore to atmospheric pressure acid leaching with sulfuric acid, thereby producing a first scandium-bearing solution containing ferric ($Fe^{3+}$) ions; (c) reducing at least a portion of the ferric ions in the first solution to ferrous ($Fe^{2-}$) ions by treating the first solution with a reductant such as Fe powder or $SO_2$, thereby obtaining a second scandium-bearing solution; and (d) recovering scandium values from the second solution.

DETAILED DESCRIPTION

Figure 1:
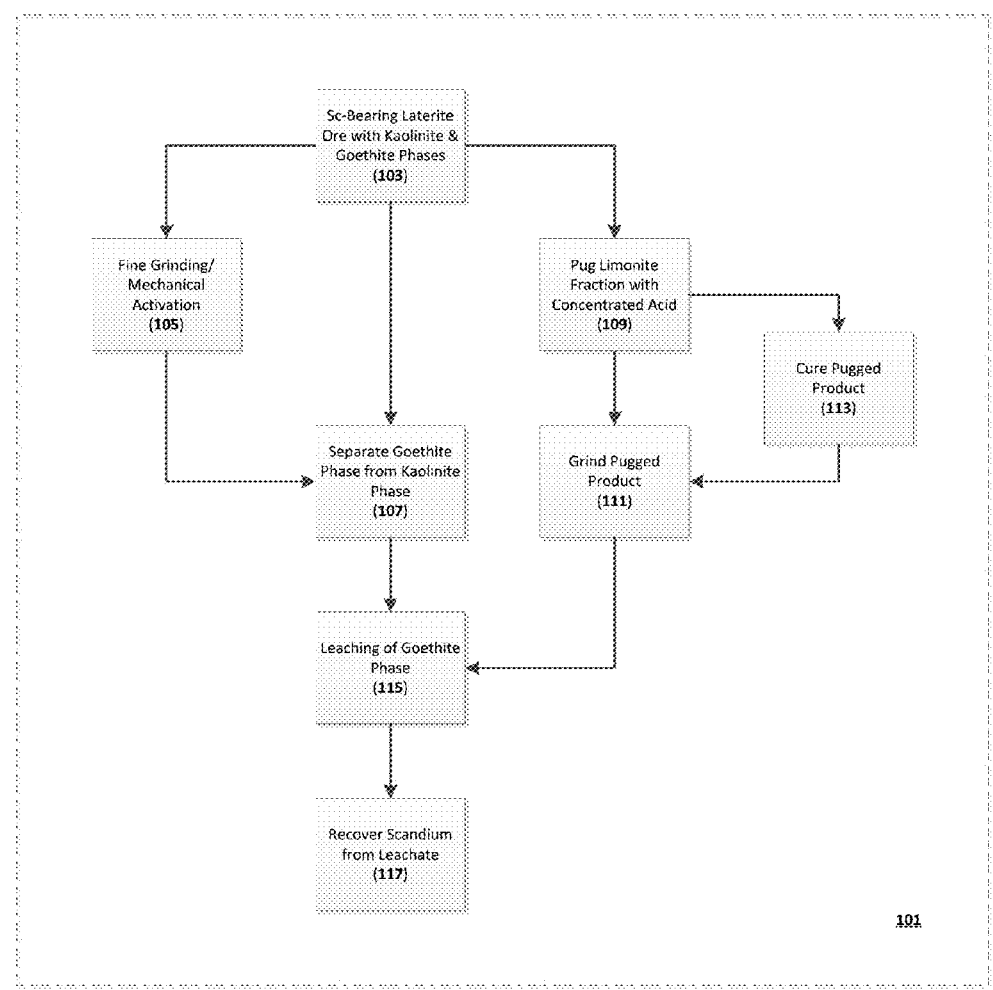
FIG. 1 is a flowchart illustrating a first embodiment of a process in accordance with the teachings herein.

In addition to the sources of scandium noted above, scandium laterite deposits may also be a significant source of the metal. Laterites are rich in iron and aluminum, and typically develop as a result of weathering of the underlying parent rock. Scandium laterite deposits resemble nickel laterite deposits in that they can feature a limonite upper zone and a saprolite lower zone which extend over the parent bedrock.

Perhaps because of the foregoing similarities, some attempts at recovering scandium values from laterite feedstocks have sought to apply to scandium laterites the procedures developed for the recovery of nickel values from nickel laterites. However, despite some similarities between scandium and nickel laterites, it has been found that these deposits also have some very significant differences. For example, scandium laterite deposits, unlike nickel laterite deposits, typically lack pay nickel or cobalt values. Hence, many of the methods used to recover nickel from nickel laterites are not economically feasible when applied to the recovery of scandium from scandium laterites, since the cost of recovering scandium from these deposits is not offset by the recovery of other significant metal values.

A further problem with some of the existing methodologies for recovering scandium is that these methods fail to account for the distribution of scandium (and of other metals such as aluminum, which may significantly affect the extraction of scandium) in scandium laterite deposits, and in the individual fractions of these deposits. For example, the limonite fraction of scandium laterite deposits has been found to consist primarily of goethite (FeOOH) and kaolinite ($Al_2Si_2O_5(OH)_4$), with samples commonly comprising about 40% goethite and about 50% kaolinite. However, the scandium content in the limonite fraction of the deposit is not homogenously dispersed among these phases. Rather, it has been found that almost all of the scandium values present in the limonite fraction are present in the goethite matrix, while the kaolinite phase is largely barren of scandium.

Similarly, in scandium laterite deposits, the aluminum content is concentrated in the kaolinite phase, which is a highly insoluble aluminum silicate. This contrasts with nickel laterite deposits, where the aluminum is found to be concentrated as boehmite (a hydrated aluminum oxide).

Another problem with some methodologies that have been developed to date for recovering scandium is that these methodologies are not sufficiently selective to scandium. Consequently, such methodologies work poorly when applied to the heterogeneous systems frequently encountered in scandium laterite ores, in which scandium is typically just one of several metals present in the ore. To further complicate matters, some of these other metals have chemical or physical properties that are similar to those of scandium, or have a tendency to take significant portions of the available scandium values with them when they precipitate out of solution. Since scandium is only present in scandium laterites in trace amounts to begin with, problems with selectivity are typically fatal to the commercial feasibility of many scandium recovery methods when those methods are applied to the recovery of scandium from scandium laterites. Consequently, while some of the foregoing methods for recovering scandium values may be suitable for some specific applications, many of these methods produce poor results (and in particular, fail to recover significant portions of the available scandium and/or to provide scandium in high levels of purity) when they are applied to scandium laterites or to particular fractions thereof.

It has now been found that some or all of the foregoing issues may be addressed by the systems and methodologies disclosed herein. In some embodiments, these systems and methodologies strategically leverage the distribution of scandium and other metals in laterite deposits to achieve a more economical and/or more effective extraction of scandium therefrom. For example, in some embodiments, the goethite and kaolinite phases of the limonite fraction of a scandium laterite deposit are separated prior to scandium extraction, thus minimizing the expenditure of resources on the scandium-barren kaolinite phase.

In other embodiments, the limonite, saprolite and/or bedrock phases of a laterite ore deposit may be isolated, and subject to different processing conditions which advantageously leverage the unique chemical and/or physical properties of these phases. For example, in some embodiments, the limonite fraction may be subjected to atmospheric pressure acid leaching, and the saprolite fraction and/or the bed rock fraction may be utilized to adjust the pH of the leachate in the atmospheric pressure acid leaching process, while also possibly contributing additional scandium values to the leachate.

In other embodiments, various processes, such as hydrothermal processing, acid retardation, solvent extraction or ion exchange, may be utilized to remove at least a portion of the $Fe^{3+}$ ions present in a scandium laterite leachate. In addition to increasing the purity of the leachate, in some applications, this may have the benefit of simplifying, and/or increasing the yield of, the subsequent Sc isolation processing steps. As a further advantage, these ferric removal processes may generate additional acid, which may be used in subsequent iterations of the leaching process.

FIG. 1 depicts a first particular, non-limiting embodiment of a method 101 for recovering scandium from a scandium-containing feedstock in accordance with the teachings herein. As seen therein, the method commences with a scandium-bearing ore having mainly kaolinite and goethite phases 103. The ore is then processed to separate the kaolinite and goethite phases 103. Separation of these phases may be achieved through various means, although the use of froth flotation is preferred. In one especially preferred embodiment of a froth flotation process, a dispersed pulp of the laterite ore is conditioned with a fatty acid type collecting agent. Such conditioning may occur either at an elevated pH to produce, following flotation, an enriched flotation tailing, or at a reduced pH to produce, following flotation, an enriched flotation concentrate. An example of the foregoing flotation process is disclosed in U.S. Pat. No. 3,711,032 (Weston), which is incorporated herein by reference in its entirety, although the Weston reference is concerned with recovering nickel from nickel laterite ores.

In some embodiments, prior to separating the kaolinite and goethite phases, the laterite ore may be subjected to various preliminary processing steps. In some embodiments, such preliminary processing steps may include fine grinding 105 such as that achieved, for example, through mechanical activation. Suitable systems and methodologies for performing ultrafine activation are described in commonly assigned U.S./2012/0055850 (Duyvesteyn), "Low Carbon Dioxide Footprint Process For Coal Liquefaction", which is incorporated herein by reference in its entirety.

In other embodiments, such preliminary processing steps may include pugging the ore with concentrated acid 109. Suitable systems and methodologies for such pugging are described, for example, in U.S. 2012/0204680 (Duyvesteyn), "System and Method for Recovery of Nickel Values from Nickel-Containing Ores", which is incorporated herein by reference in its entirety. Various acids may be utilized for pugging the ore, although the use of concentrated sulfuric acid and concentrated nitric acid are especially preferred. In some applications, this step may be especially advantageous when processing the limonite fraction of scandium-bearing laterite ores. Subsequent to pugging 109, the ore may be ground 111, as through the use of, for example, a mechanical grinder. In some cases, the ore may be subject to fine or ultrafine grinding, which may be achieved, for example, through mechanical activation, as described above.

In some embodiments, the pugged ore may be cured 113 before grinding. Various curing times may be utilized for this purpose. Typically, however, the ore is cured for at least 6 hours, preferably for at least 12 hours, more preferably for at least 18 hours, and most preferably for at least 24 hours.

Figure 2:
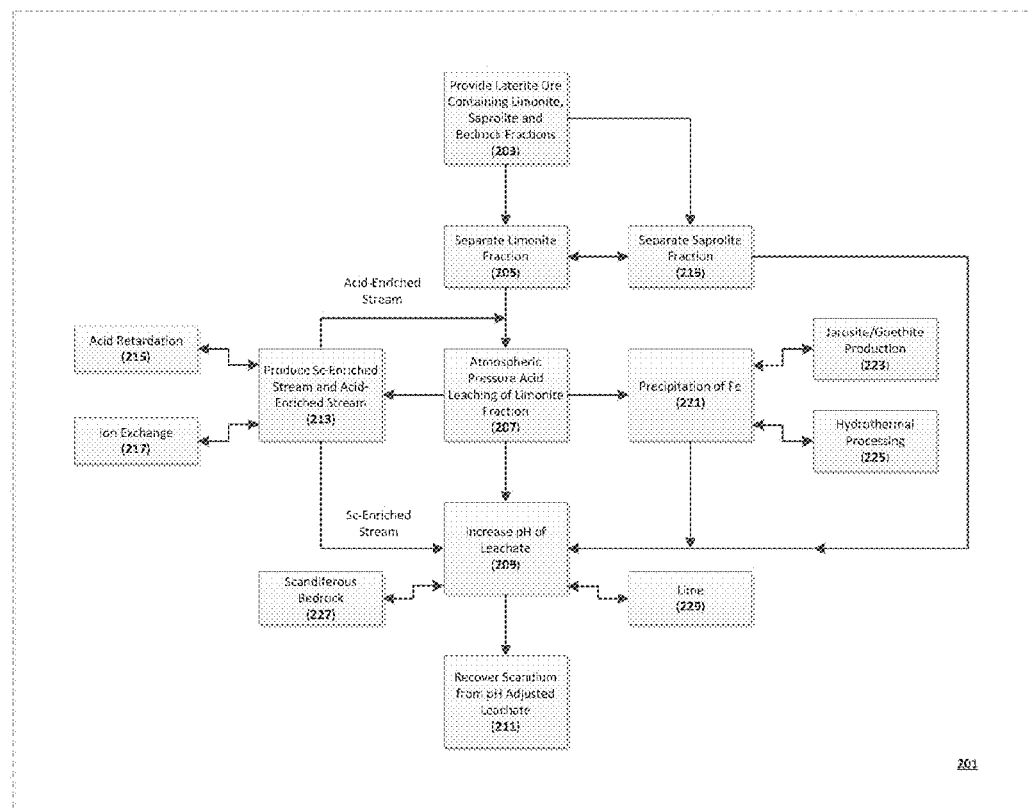
FIG. 2 is a flowchart illustrating a second embodiment of a process in accordance with the teachings herein.

FIG. 2 depicts a second particular, non-limiting embodiment of a method 201 for recovering scandium from a scandium-containing feedstock solution in accordance with the teachings herein. As seen therein, the method commences with a laterite ore feedstock which contains fractions from the limonite, saprolite and bedrock fractions of the ore deposit 203. The limonite fraction is then separated from the feedstock 205. Various processes may be used for such separation including, for example, froth flotation of the type described above. The separated limonite fraction may then be subjected to atmospheric pressure acid leaching 207. The pH of the leachate is then increased 209, which may be accomplished, for example, through the use of scandiferous bedrock 227 or lime 229, and scandium values are recovered from it 211.

In some embodiments, the saprolite fraction may be separated 219 from the laterite ore as well, either as part of, or independently of, the saprolite separation. In such embodiments, the separated saprolite fraction and/or scandiferous bed rock material may be added to the leachate from the atmospheric pressure acid leaching 207 process to increase the pH of the leachate 209.

In a preferred embodiment, the atmospheric pressure acid leaching 207 utilized in the method 201 results in a first, acid-enriched stream and a second, scandium-enriched stream 213. This result may be achieved through acid retardation 215, or by treating the leachate with an ion exchange resin (or solvent extraction) 217 (in which case the effluent forms the acid-rich stream, and the scandium-rich stream is formed by stripping the resin with an appropriate stripping solution). The scandium-enriched stream is then processed via steps 209 and 211 as described above, while the acid enriched stream is preferably fed back into a subsequent iteration of the atmospheric pressure acid leaching process 207, thus leveraging its acid content.

In some embodiments, a portion of the Fe content may be precipitated 221 during or after the atmospheric pressure acid leaching process 207. This may be achieved, for example, through the production of jarosite or goethite 223 in the leachate, or by subjecting the leachate to hydrothermal processing 225 with hematite precipitation. Precipitation of Fe is desirable (so long as such precipitation is conducted under proper conditions to avoid co-precipitating Sc) in that it simplifies subsequent recover of scandium values. A variety of factors such as, for example, pH of the leachate, may determine the conditions under which jarosite precipitation will or will not co-precipitate scandium with it. Some of these factors and the associated phase diagrams are described in commonly assigned U.S. 2012/0207656 (Duyvesteyn), entitled "System and Method for Recovery of Scandium Values From Scandium-Containing Ores", which is incorporated herein by reference in its entirety.

Figure 3:
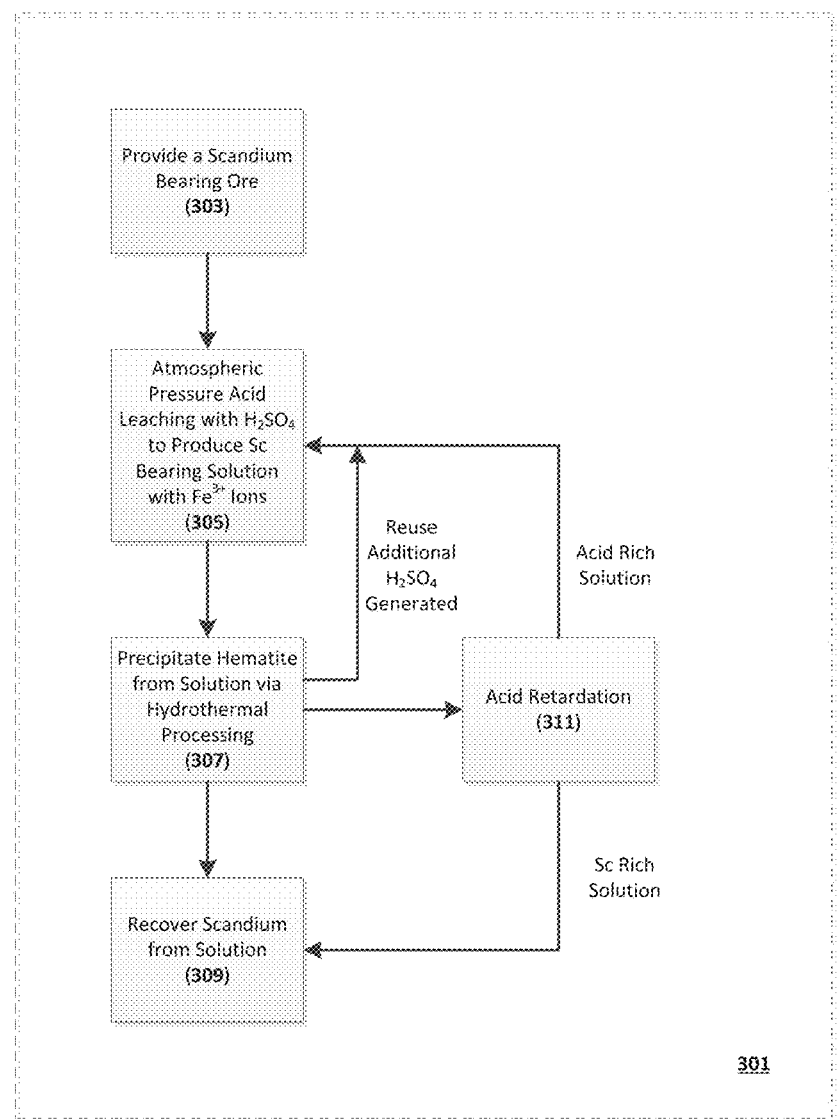
FIG. 3 is a flowchart illustrating a third embodiment of a process in accordance with the teachings herein.

FIG. 3 depicts a third particular, non-limiting embodiment of a method 301 for recovering scandium from a scandium-containing feedstock in accordance with the teachings herein. As seen therein, the method commences with the provision of a scandium-bearing ore 303. The ore is subjected to atmospheric pressure acid leaching 305 with $H_2SO_4$ (or $HNO_3$) to obtain a scandium-bearing leachate which also contains $Fe^{3+}$ ions. The leachate is then subjected to hydrothermal processing 307 to precipitate hematite or a basic iron sulfate therefrom, after which scandium values are recovered 309 from the processed solution. In some embodiments, the extra $H_2SO_4$ generated by the hydrothermal processing step 307 may be utilized in the atmospheric pressure acid leaching step 305 of a subsequent iteration of the process.

In other embodiments, an acid retardation step 311 or an ion exchange resin or a liquid extraction solvent may be utilized to generate an acid rich solution and a scandium-rich solution after precipitation of hematite 307. The acid-rich solution may then be utilized in the atmospheric pressure acid leaching step 305 of a subsequent iteration of the process, and the scandium-rich solution may then be processed for the recovery of scandium 309 therefrom.

Figure 4:
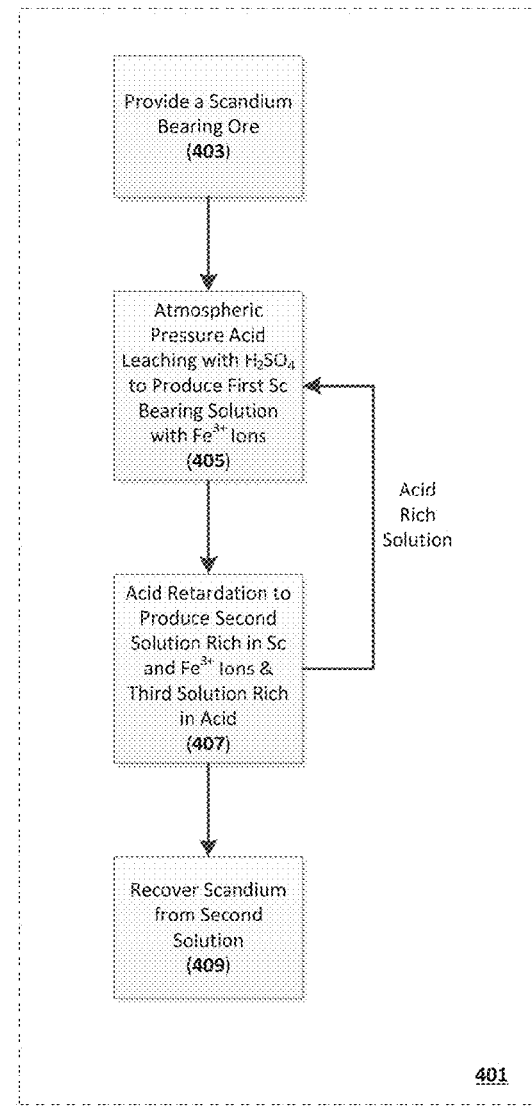
FIG. 4 is a flowchart illustrating a fourth embodiment of a process in accordance with the teachings herein.

FIG. 4 depicts a fourth particular, non-limiting embodiment of a method 401 for recovering scandium from a scandium-containing feedstock in accordance with the teachings herein. As seen therein, the method commences with the provision of a scandium-bearing ore 403. The ore is subjected to atmospheric pressure acid leaching 405 with $H_2SO_4$ to obtain a scandium-bearing leachate which also contains $Fe^{3+}$ ions. The leachate is then subjected to acid retardation 407 to produce a scandium-rich solution and an acid-rich solution. The scandium-rich solution is then processed for recovery of scandium values 409 therefrom. The acid-rich solution may then be utilized in the atmospheric pressure acid leaching step 405 of a subsequent iteration of the process.

Figure 5:
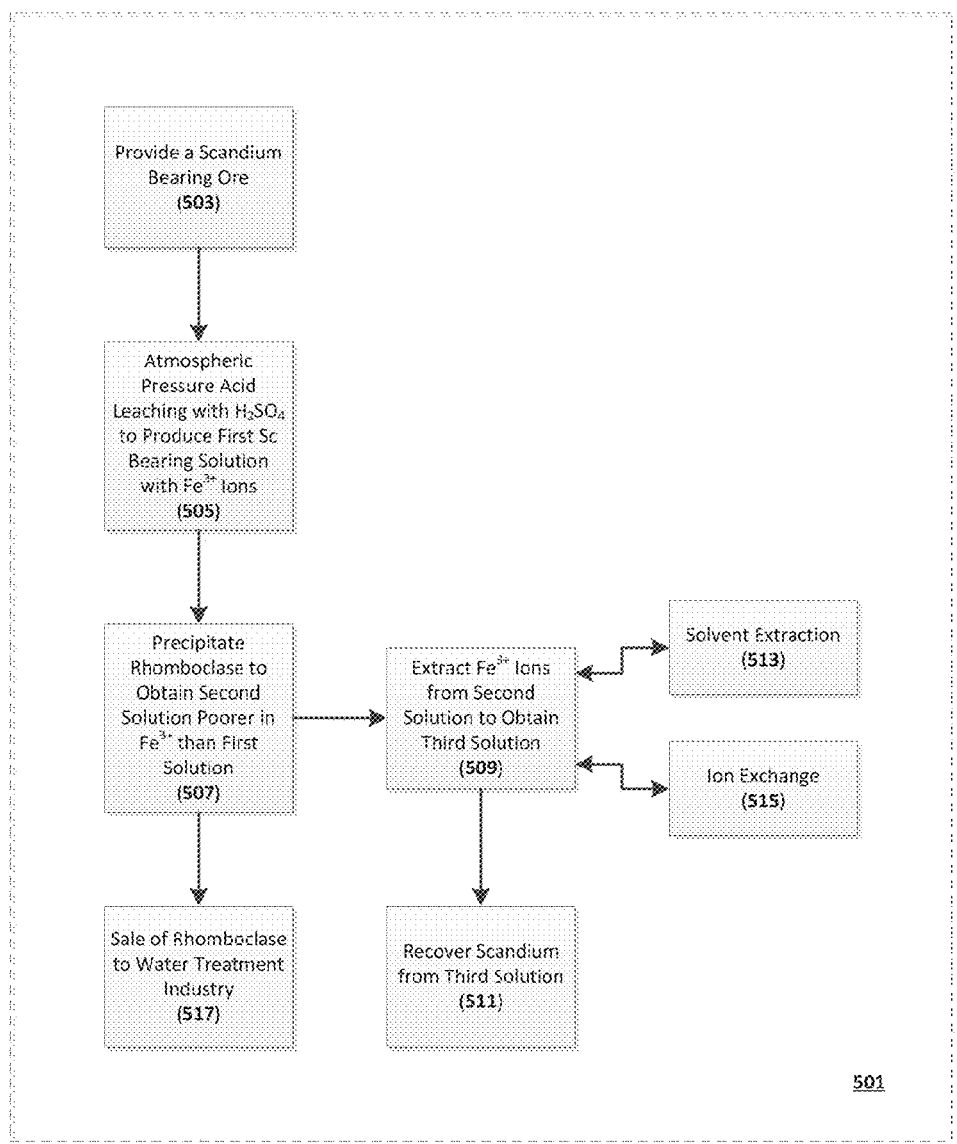
FIG. 5 is a flowchart illustrating a fifth embodiment of a process in accordance with the teachings herein.

FIG. 5 depicts a fifth particular, non-limiting embodiment of a method 501 for recovering scandium from a scandium-containing feedstock in accordance with the teachings herein. As seen therein, the method commences with the provision of a scandium-bearing ore 503. The ore is subjected to atmospheric pressure acid leaching 505 with $H_2SO_4$ to obtain a scandium-bearing leachate which also contains $Fe^{3+}$ ions. Rhomboclase, an acidic iron sulfate mineral with a formula variously reported as $H_5Fe^{3+}O_2(SO_4)_2 \cdot 2(H_2O)$ or $HFe(SO_4)_2 \cdot 4(H_2O)$, is then precipitated 507 from the leachate to obtain a solution which is poorer in iron than the leachate. The precipitated rhomboclase may then be isolated and sold as a product to, for example, the water treatment industry 517. Scandium values are subsequently recovered from the supernatant solution 511.

In some embodiments, a portion of the remaining $Fe^{3+}$ ions may be extracted 509 from the leachate after the precipitation of rhomboclase. This may be accomplished, for example, through solvent extraction 513, or via ion exchange 515.

Figure 6:
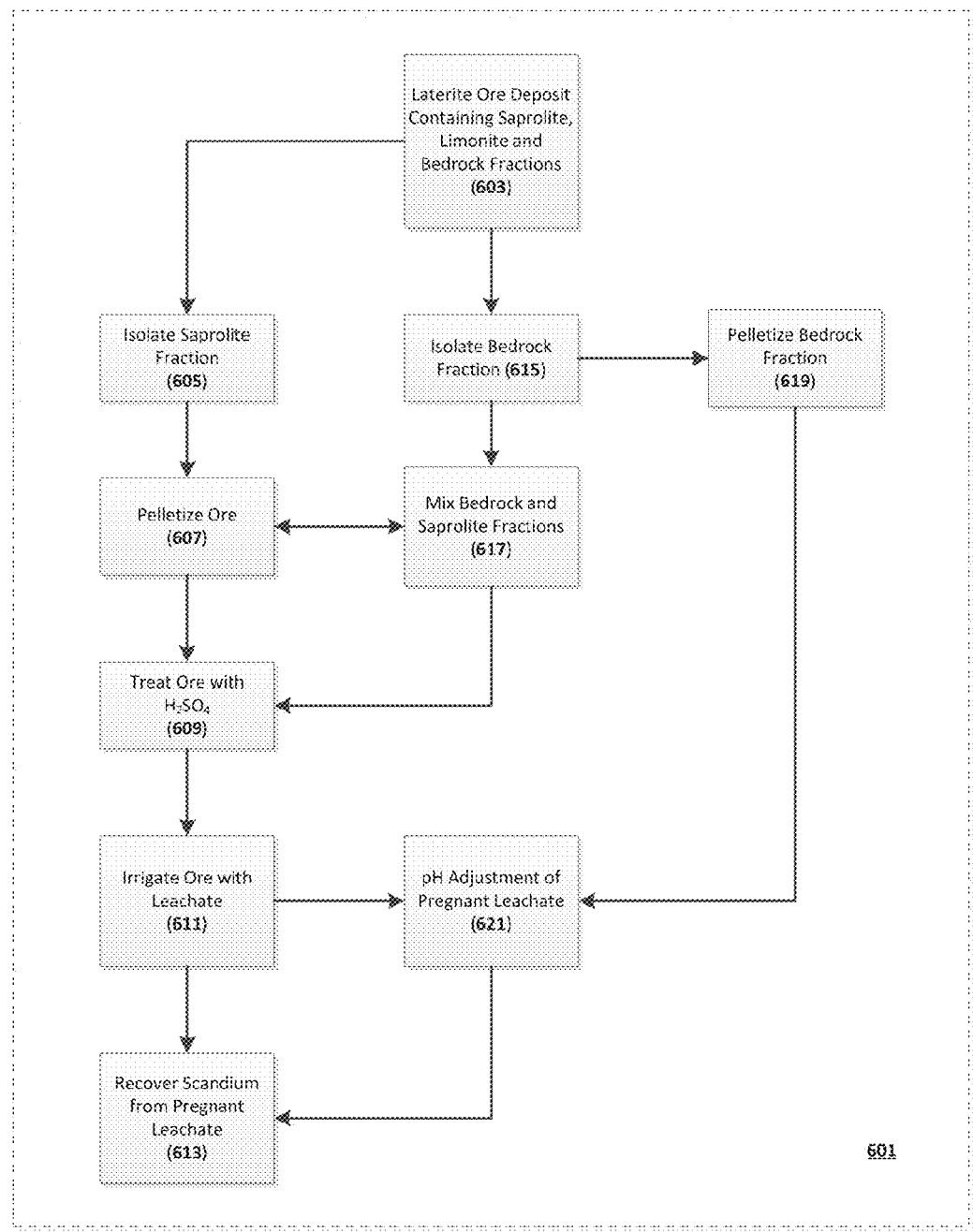
FIG. 6 is a flowchart illustrating a sixth embodiment of a process in accordance with the teachings herein.

FIG. 6 depicts a sixth particular, non-limiting embodiment of a method 601 for recovering scandium from a scandium-containing feedstock in accordance with the teachings herein. As seen therein, the method commences with a laterite ore feedstock which contains fractions from the limonite, saprolite and bedrock fractions of the ore deposit 603. The saprolite fraction is then separated from the feedstock 605, and is pelletized 607 using sulfuric acid as a binder.

The pelletized ore is then treated with $H_2SO_4$ 609 to obtain a treated ore. This treatment may involve curing the treated ore. The treated ore is then irrigated 611 with a leachate, and scandium values are recovered 613 from the resulting pregnant leachate.

In some embodiments, the bedrock fraction is also isolated 615 from the ore, either separately or after the saprolite fraction has been isolated. The bed rock material may be used for pH adjustment 621, since it contains significant acid neutralization capacity as well as scandium values due to its hydrated magnesium silicate content, in which case it may be pelletized 619. Otherwise, the isolated bedrock fraction may be mixed with the saprolite fraction 617.

Figure 7:
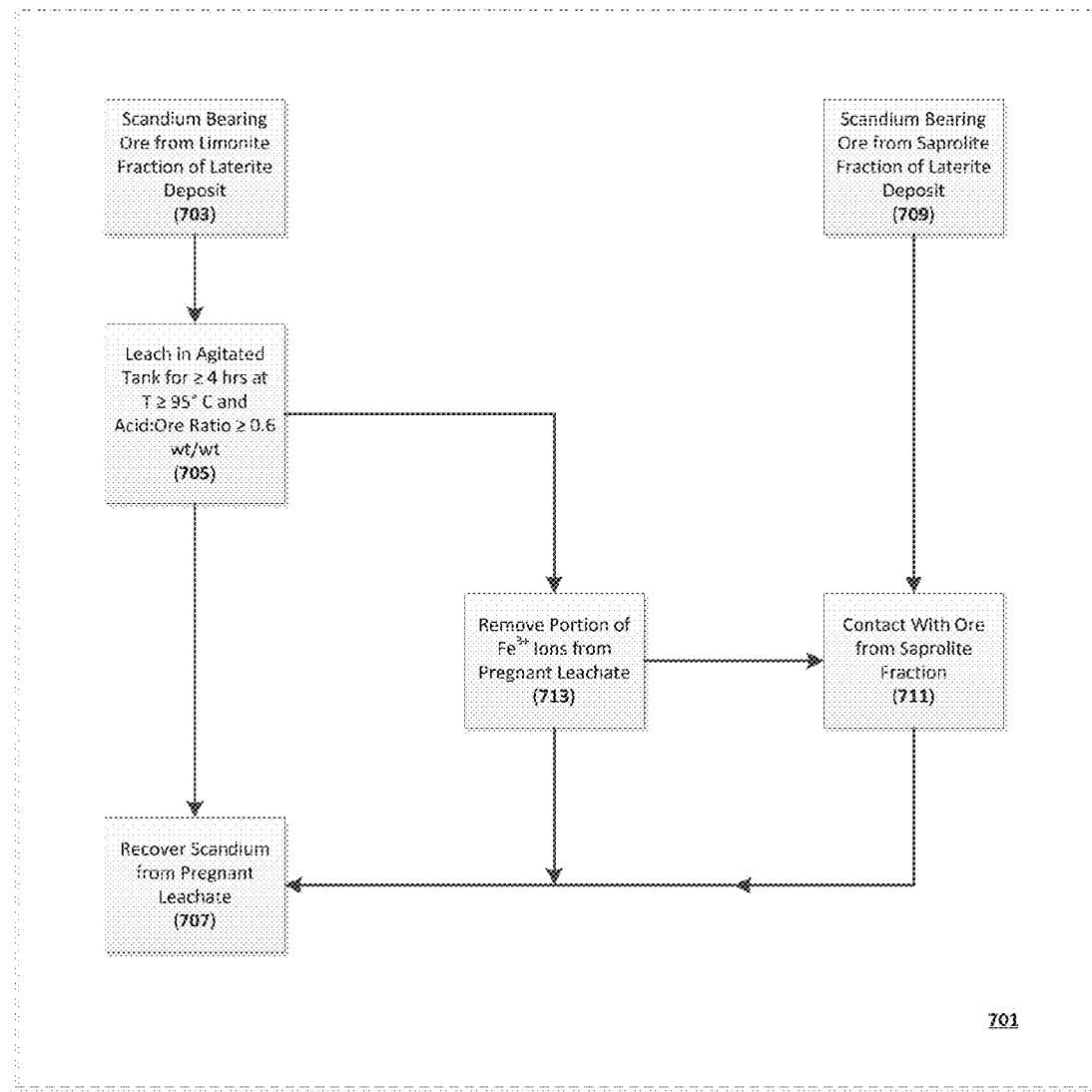
FIG. 7 is a flowchart illustrating a seventh embodiment of a process in accordance with the teachings herein.

FIG. 7 depicts a seventh particular, non-limiting embodiment of a method 701 for recovering scandium from a scandium-bearing ore in accordance with the teachings herein. As seen therein, the method commences with a scandium-bearing ore obtained from the limonite fraction of a laterite deposit 703. The ore is leached in an agitated tank 705 for at least 4 hours at a temperature of at least 95° C., and at an acid-to-ore ratio of at least 0.6 wt/wt. Scandium values are then recovered from the resulting pregnant leachate 707.

In some embodiments, a portion of $Fe^{3+}$ ions may be removed from the leachate. This may be accomplished, for example, through solvent extraction, or via ion exchange, and scandium values may be recovered 707 from the resulting solution. In other embodiments, a scandium-bearing ore obtained from the saprolite fraction of a laterite deposit 709 is also provided. This ore may be contacted 711 with the leachate from step 713, and scandium values may be recovered 707 from the resulting solution.

The systems and methodologies disclosed herein may be further understood with respect to the following particular, non-limiting examples.

Figure 8:
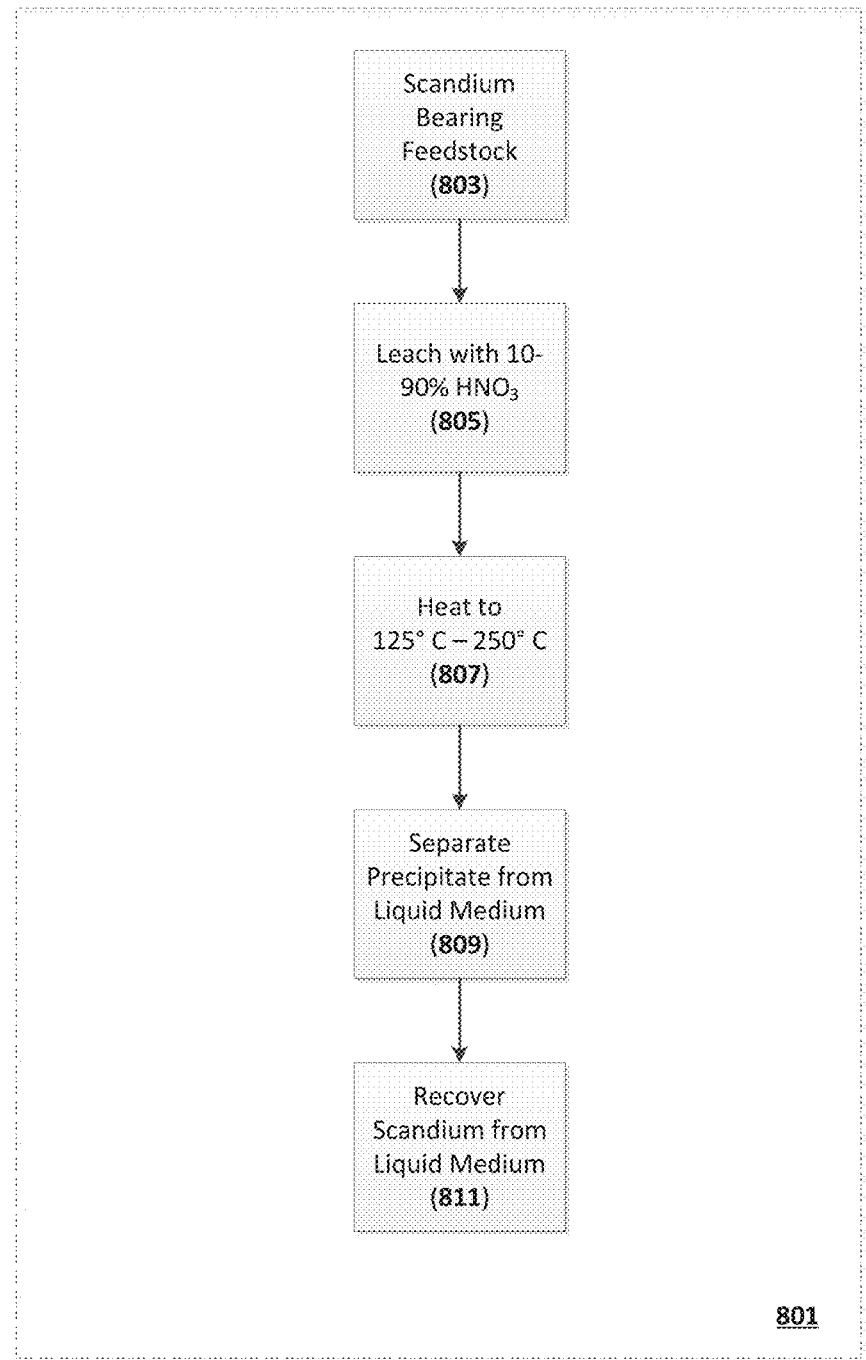
FIG. 8 is a flow chart illustrating an eighth embodiment of a process in accordance with the teachings herein.
Figure 9:
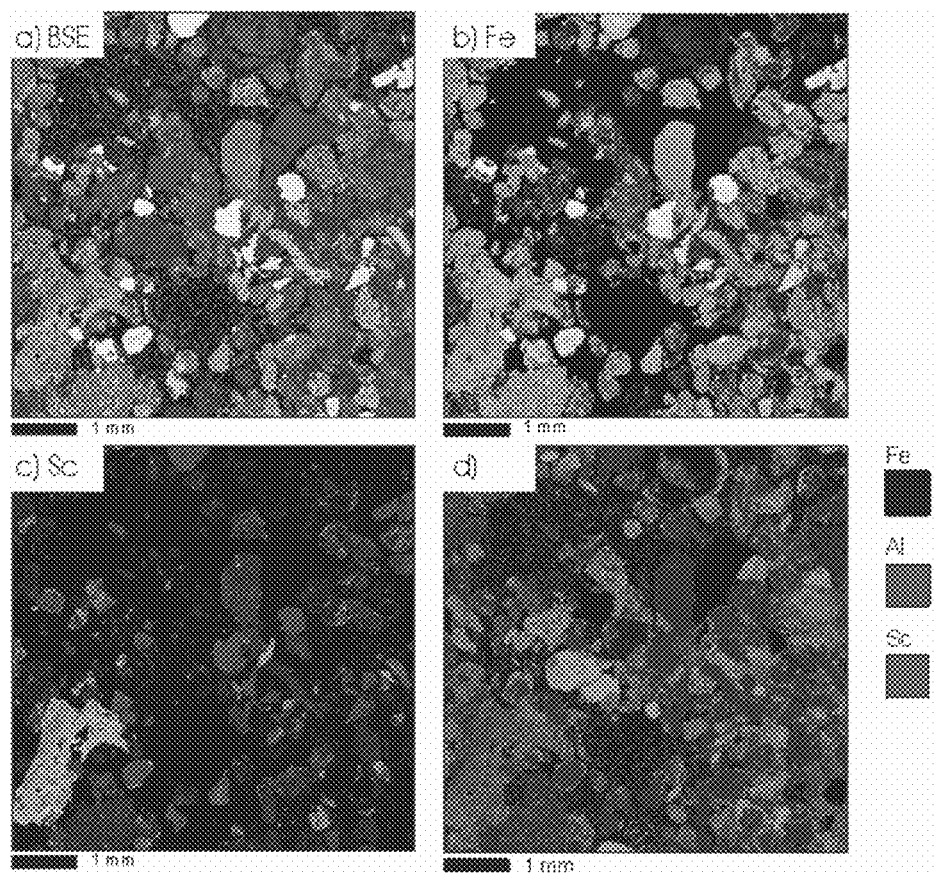
FIG. 9 is an electron micro probe (EMP) mapping (−2 mm head) of a scandium laterite sample, and includes a back-scattered electron (BSE) image (FIG. 9a), a single element map showing the distribution of Fe in the sample (FIG. 9b), a single element map showing the distribution of Sc in the sample (FIG. 9c), and a composite three element map overlaying the data for Fe, Al and Sc (FIG. 9d).

FIG. 8 depicts an eighth particular, non-limiting embodiment of a method 801 for recovering scandium from a scandium-bearing feedstock in accordance with the teachings herein. As seen therein, the method 801 commences with the provision of a scandium bearing feedstock 803. The feedstock is then leached 805 with a leachate which typically comprises 10-90% $HNO_3$, preferably comprises 30-70% $HNO_3$, and most preferably comprises 40-60% $HNO_3$. The leaching is preferably conducted at a temperature within the range of 50° C. to 150° C., more preferably at a temperature within the range of 70° C. to 130° C., and most preferably at a temperature within the range of 90° C. to 110° C., though in some applications it may be desirable to conduct the leaching near the boiling point of the leachate (about 135° C. for some $HNO_3$ solutions). The leaching is also preferably implemented at atmospheric pressure.

In some variations of this method, sulfuric acid may be used as the leachate. In such embodiments, it may again be desirable in some applications to conduct the leaching near the boiling point of the leachate, which is about 107° C. for some sulfuric acid solutions.

After leaching, the leachate is heated 807 to a temperature within the range of 125° C. to 250° C., more preferably to a temperature within the range of 150° C. to 225° C., and most preferably to temperature within the range of 170° C. to 200° C. This heating, which is preferably implemented in a low pressure autoclave, results in a precipitate which predominantly comprises iron, aluminum and possibly manganese, and a scandium bearing supernatant. The supernatant may then be separated 809 from the precipitate by filtering or by other suitable means, after which scandium values may be recovered 811 from the supernatant.

Example 1

This example illustrates some of the significant differences that exist between nickel laterite ores and scandium laterite ores.

Samples of scandium laterite ore were obtained from the Nyngan Gilgai Scandium Deposit in Nyngan, New South Wales, Australia. The Nyngan Gilgai Scandium Deposit lies within MGA zone 55, coordinates GDA 94, latitude: −31.5987, longitude: 146.9827. For comparison, samples of nickel laterite ore were obtained from a nearby nickel laterite deposit in the same region. The samples were subjected to various physical and chemical tests, the results of which are depicted in TABLE 1 below. Economic information for the two ores is also provided in TABLE 1.

TABLE 1

Comparison of Typical Nickel and Scandium Laterite Ores

| | | Typical Nickel Laterite Ore | | | Typical Scandium Laterite Ore | | |
|---|---|---|---|---|---|---|---|
| | | Limonite | Saprolite | Bedrock | Limonite | Saprolite | Bedrock |
| Physical | color | red-brown | grey-green | grey | red-brown | grey-green | grey |
| | % <74 micron | 90 | 10-30 | <5 | 90 | 20-50 | <5 |
| | depth - meters | 0-10 | 0-15 | 10-20 | 0-50 | 20-30 | 10-30 |
| | thickness - meters | 0-15 | 2-10 | NA | 2-40 | 0-20 | NA |
| Chemical | Ni wt % | 1.2 | 2.0 | 0.3 | | | |
| | Sc - ppm | | | | 400 | 280 | 100 |
| | main minerals | goethite (90%), gibbsite (7%) | serpentine, nontronite clay | olivine | kaolinite (50%), goethite (40%) | serpentine, nontronite clay | pyroxene |
| | Al - wt % | 3-5 | 2-3 | NA | 7-12 | 3-5 | NA |
| | Fe - wt % | 40-50 | 20-30 | <10 | 20-25 | 10-20 | <10 |
| | SiO2 - wt % | <5 | 10-20 | >40 | 25 | 30 | >40 |
| | Mg - wt % | <2 | 10-20 | >25 | <0.5 | <4 | 10 |
| Economics | rock value ($/ton) with Ni@$8/lb and $Sc_2O_3$@$2,000/kg | 200 | 320 | 48 | 1,200 | 850 | 300 |

As seen in TABLE 1, while the nickel values in the nickel laterite samples reside primarily in the saprolite fraction, the scandium values in the scandium laterite samples reside primarily in the limonite. Notably, the value of the bed rock fraction the scandium laterite deposit is about equal in value to the richest zone (saprolite) of the nickel laterite deposit, thus demonstrating the significant differences in economic considerations involved in processing the two ores.

Example 2

The scandium laterite samples of EXAMPLE 1 were subjected to x-ray diffraction (XRD) and electron micro probe (EMP) analyses. The EMP mapping (−2 mm head) of a scandium laterite sample is reproduced in FIG. 8, and includes a back-scattered electron (BSE) image (FIG. 8a), a single element map showing the distribution of Fe in the sample (FIG. 8b), a single element map showing the distribution of Sc in the sample (FIG. 8c), and a composite three element map overlaying the data for Fe, Al and Sc. These results further highlight some of the significant differences between nickel laterite and scandium laterite ores and deposits and the components thereof.

For example, the x-ray diffraction (XRD) results for samples of the unprocessed scandium laterite ore shows that the samples predominantly comprise the mineral phases kaolinite ($Al_2Si_2O_5[OH]_4$), goethite (FeO.OH), hematite ($Fe_2O_3$), quartz ($SiO_2$), maghemite ($\gamma$-$Fe_2O_3$) and mica (mainly present in the form muscovite—$KAl_2[Al,Si_3O_{10}][OH]_2$), with these minerals listed in approximate order of abundance.

Electron micro probe (EMP) analysis of the unprocessed scandium laterite ore indicates that scandium is present in the ore predominantly within the hydrated Fe-oxide phase (goethite). Scandium levels within the goethite phase were found to range from between ~300 ppm to a maximum recorded value of 2050 ppm. However, not all goethite grains in the sample were found to contain scandium, thus indicating that the distribution of scandium in the samples is inhomogeneous.

The BSE image of FIG. 8a depicts the entire mapped area. In this map, brighter areas correspond to phases with higher atomic number, while darker regions correspond to low atomic number phases. Thus, for example, Fe-rich minerals appear bright in the map, while Al- and Si-rich phases appear as a darker shade.

FIG. 8b maps the distribution of Fe in the sample. In this map, warmer colors (e.g., reds and whites) indicate regions with high concentrations of Fe, while cooler colors (i.e., blue and green) indicate regions with lower relative concentrations of Fe. Phases such as hematite (~67% Fe) therefore appear white in color on this map, while aluminosilicate phases appear dark blue (if minor amounts of Fe are incorporated into the structure) or black (if no Fe is incorporated into the structure, thus rendering the material invisible). Therefore, on the Fe distribution map, goethite grains typically appear in shades of red and orange, while quartz grains (which appear dark grey on the BSE image) are not visible at all.

FIG. 8c maps the distribution of Sc in the sample. As in the Fe distribution map, warmer colors in this map indicate higher concentrations of scandium. The scandium map in FIG. 8c shows that, in general, higher Sc levels are recorded in the Fe-containing grains represented by goethite and hematite. Notably, however, the highest scandium levels appear to be more directly associated with the goethite phase rather than the hematite phase (see, for example, the large goethite particle in the bottom left of FIG. 8c).

FIG. 8d is a composite three element map overlaying the data for Fe, Al and Sc. In this map, the association between Fe and Sc is evident as a merging of grains that are high in Fe (blue) and high in scandium (red). Thus, grains that contain Fe and a high Sc content are therefore pink/mauve in color.

The map data also suggests that the goethite grains also contain slightly elevated levels of Al (up to 2-3 wt %), but are generally low in total Mg and Si. The maximum scandium levels recorded in the large Sc-rich goethitic particle shown in FIG. 8c were up to 0.3 wt % Sc (this is a semi-quantitative estimate only). Although this is significantly higher than the 313 ppm recorded for the bulk unprocessed ore, it should be noted that most of the minerals in the sample contain virtually zero scandium (or, at least, very low levels).

Example 3

This example illustrates an example of direct acid leaching of a scandium laterite ore.

The scandium laterite ore of EXAMPLE 1 was leached, without any prior treatment, with 1.5 M $H_2SO_4$ at 60° C. for 2 hours (sample GILH1W) and with 5.0 M $H_2SO_4$ at 105° C. for 2 hours (sample GILH2L). In another experiment (sample GILHWL), the solid residue of the GILH1W test was re-leached with the waste filtrate of GILH2L test. The test conditions and scandium extraction rates are shown in TABLE 2, while the XRF data on associated residue solids are shown in TABLE 3.

TABLE 2

Direct leach treatment conditions and results (wt %) on Sc laterites

| Label | Leach with | Lixiviant Volume (mL) | Time Temp (C.) | Wt (g) IN | Wt (g) OUT | $Sc_2O_3$ wt % in solid residue | % $Sc_2O_3$ dissolved | pH |
|---|---|---|---|---|---|---|---|---|
| GILH1W | 1.5M $H_2SO_4$ | 200 | 2 h/60 | 50 | 47.8 | 0.047 | 16.8 | 0.25 |
| GILH2L | 5M H2SO4 | 200 | 2 h/105 | 50 | 29.75 | 0.022 | 75.8 | 0.28 |
| GILH1WL | GILH2L filtrate | 90 | 2 h/105 | 23 | 13.35 | 0.019 | 76.5 | −0.05 |

TABLE 3

XRF Data on Residue Solids*

| Sample I.D. | $Sc_2O_3$ | $TiO_2$ wt % | $Fe_2O_3$ wt % | MnO wt % | $Al_2O_3$ wt % | $SiO_2$ wt % | MgO wt % | CaO wt % | $K_2O$ wt % | $V_2O_5$ wt % | $Cr_2O_3$ wt % |
|---|---|---|---|---|---|---|---|---|---|---|---|
| Gilgai-Head | 540 | 1.20 | 40.1 | 0.75 | 18.0 | 27.5 | 0.52 | NA | NA | NA | NA |
| GILH1W | 470 | 1.28 | 39.5 | 0.64 | 18.0 | 29.0 | 0.37 | 0.047 | 0.102 | 0.112 | 0.314 |
| GILH2L | 220 | 1.55 | 13.7 | 0.52 | 20.4 | 45.6 | 0.20 | 0.059 | 0.122 | 0.065 | 0.174 |

*The conversion factor for $Sc_2O_3$ to Sc is 0.65196

These tests indicated a strong dependence on acid concentration to extract scandium at substantial levels. Thus, at 5M $H_2SO_4$, it was possible to extract 76% of scandium to the filtrate. Scandium extraction was significantly lower (17%) when acid concentration was reduced to 1.5M $H_2SO_4$. Re-leaching the residue of this test with the waste filtrate of 5M $H_2SO_4$ test increased the Sc extraction from 17% to 77%.

Sample GILH1W is notable, where 75.8% of the scandium was leached after two hours, at an operating temperature of 105° C. and using 2,000 kg acid per ton of limonite ore. Comparing the results achieved for GIL1W with atmospheric leaching of nickel limonite, the impact in the difference in the required leach time is apparent. A shrinking core leaching system may be utilized for such leaching, in which case an intensive agitation may be beneficial.

Example 4

Figure 10:
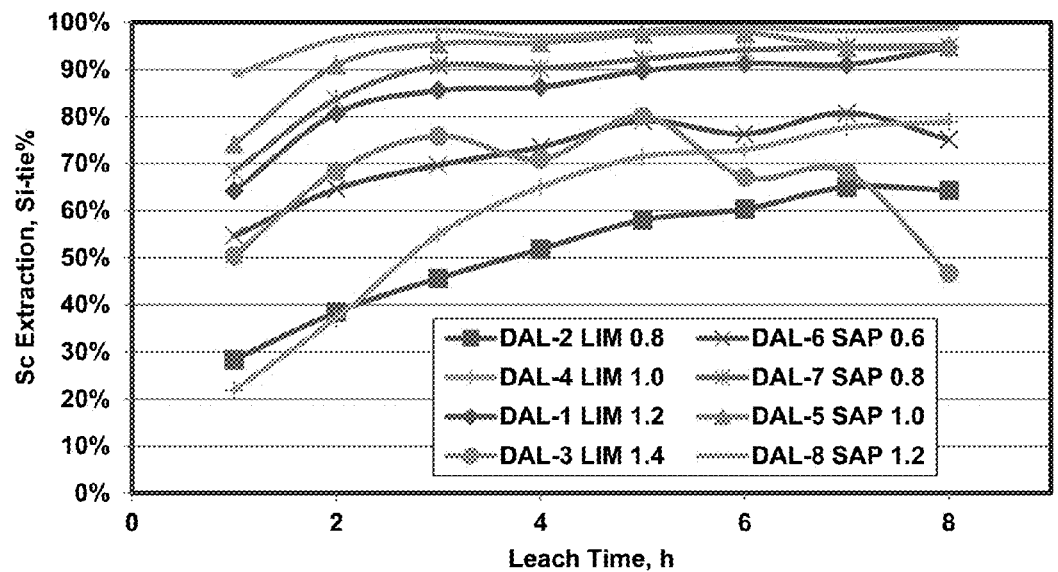
FIG. 10 is a graph of scandium extraction applying a hot acid tank leach as a function of leach time.
Figure 11:
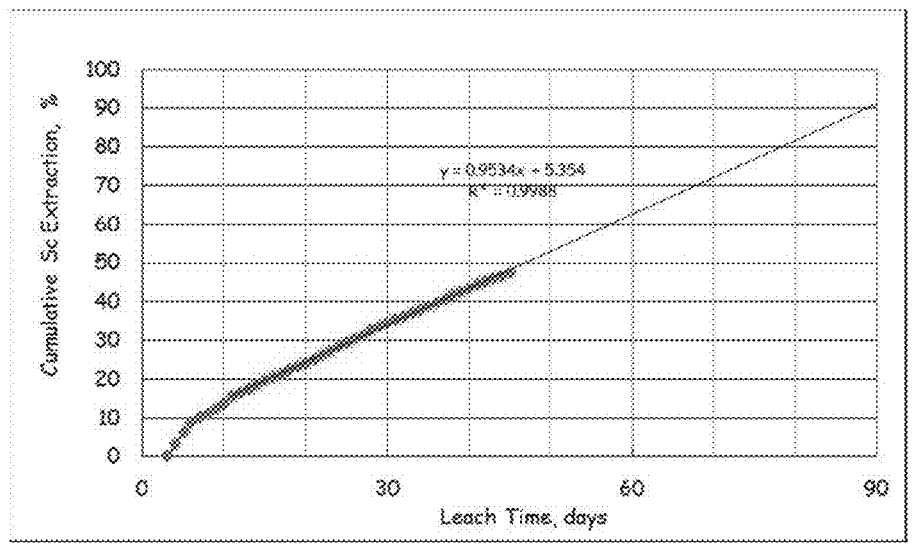
FIG. 11 is a graph of cumulative scandium extraction applying a room temperature heap leach as a function of leach time.

Nyngan limonite and saprolite samples were leached under atmospheric conditions at about 100° C. with sulfuric acid for 8 hours with samples extracted every hour. The acid-to-ore ratios employed ranged from 0.8 to 1.4 for the limonite material and from 0.6 to 1.2 for the saprolite material. Scandium extraction (as a percentage of the total scandium present) as a function of leach time is shown in the graph of FIG. 10. As seen therein, the saprolite direct acid leach (DAL) performed better than the limonite DAL. In this respect, it is to be noted that the four top curves in the graph are for saprolite.

Example 5

This example demonstrates the heap leaching of scandium laterite ore.

Nyngan saprolite ore was agglomerated with 100 kg $H_2SO_4$/ton, cured for 24 hours and subjected to heap leaching with 100 gpl $H_2SO_4$ under room temperature conditions. Samples of the leachate were extracted on a daily basis to determine the cumulative scandium extraction as a function of leach time. The results are depicted in the graph of FIG. 10. As seen therein, after the first several days, cumulative scandium recovery increased at a constant rate of about 1% per day, and is projected to reach just over 90% after 90 days.

Example 6

This example demonstrates the use of direct flotation to concentrate the metal values of a scandium-bearing laterite ore containing niobium and titanium values. In this example, the flotation was employed in the context of an operation in which it was desired to process the niobium values into ferroniobium, in addition to recovering the scandium and titanium values from the ore.

A series of flotation tests were performed using direct pyrochlore flotation using 2-4 kg of the ore feedstock that had been ground at 100% passing ($P_{100}$) of between 20 and 104 μm. Various reagents, reagent dosages, grind sizes and operation parameters were investigated. The flotation tests were found to produce flotation concentrates with over 2.3% $Nb_2O_5$, recoveries of over 70% $Nb_2O_5$, and weight recoveries in the range of 15-20%.

Using the information learned from the foregoing tests, a larger mechanical flotation test was conducted. Prior to flotation, the ore feedstock was ground using two ball mills, and then passed through Low Intensity Magnetic Separators (LIMS) arranged in series. The flotation circuit utilized consisted of five (5) rougher stages and four cleaner stages. A total of 1100 kg of ore feedstock was processed over a 30 hour period, generating a concentrate with 3.33% $Nb_2O_5$, 55.7% $Nb_2O_5$ recovery, in 10.2% mass pull.

Example 7

This example demonstrates the improvements possible with column flotation as compared to direct mechanical flotation in concentrating metal values in the context of an operation in which it was desired to process the niobium values into ferroniobium, in addition to recovering the scandium and titanium values from the ore.

An ore feedstock of the type used in EXAMPLE 6 was prepared that was 100% passing 37 μm and 80% passing 20 μm. Several column flotation tests were performed on the feedstock. These included ten rougher column tests, one column bulk rougher run under the optimized flotation conditions, a single 1st scavenger bulk run test on the rougher tail, a single 2nd scavenger bulk run test on the 1st scavenger tail, six cleaner tests on the combined concentrates of the rougher, $1^{st}$ and 2nd scavenger, and four scavenger column tests on the cleaner tails.

All the test results showed that column flotation, with the use of wash water, provided superior results to those achieved using conventional (e.g., direct mechanical) flotation techniques conducted without froth washing. Under the optimized flotation conditions a rougher-scavenger-scavenger arrangement complete with a cleaner and cleaner scavenger step achieved a final combined concentrate of 5.6% $Nb_2O_5$, at a mass yield of 11.2%, and an $N_2O_5$ recovery of 72.6%. Final combined concentrate showed a $TiO_2$ grade of 21.4% with 77.6% recovery (feed grade of 3.1%). Scandium was found to follow the mass pull of the flotation, yielding approximately 11% recovery.

Example 8

This example demonstrates some of the advantages possible with pretreatment of scandium-bearing ores.

While the column flotation process used in EXAMPLE 7 was found to be an improvement over the direct mechanical flotation process described in EXAMPLE 6 with the scandium laterite ore feed being utilized, the scandium recovery was found to be very low in the flotation. Accordingly, leach test work was conducted on coarse whole ore material. In particular, a leach using hydrochloric acid was introduced followed by the original sulfation. Coarse whole are leach test work showed that a high recovery of the scandium could be achieved without any added losses of titanium or niobium. A process flowsheet was then established based on test work performed in leaching, purification, sulfation and precipitation.

A total of 800 kg of feed samples were processed for use in the leach test work. This included a total of ten representative samples representing different areas of the source mine that could be reasonably expected during production, and these samples were combined into a composite sample used as the feedstock in the leach test work. A summary of the combined feed material used in the leach test work is given in TABLE 4.

TABLE 4

| Ore Feed Assay Ore Feedstock Assay (%) | |
|---|---|
| Si | 4.78 |
| Al | 1.15 |
| Fe | 13.5 |
| Mg | 5.34 |
| Ca | 12.6 |
| Na | 0.31 |
| K | 1.21 |
| Ti | 1.97 |
| P | 0.33 |
| Mn | 0.51 |
| Cr | 0.01 |
| V | 0.03 |
| Ba | 4.16 |
| Y (g/t) | 181 |
| Sc (g/t) | 83 |
| S | 1.45 |
| Nb | 0.59 |
| Th (g/t) | 506 |
| U (g/t) | 52 |

A total of 13 HCl pre-leach tests performed on the individual variability samples at the bench scale level. Using different hydrochloric acid concentrations and residence times, the leachability of the gangue material in the mineralized material was confirmed. The results supported compositing the samples into one sample, as there was little difference in the pre-leach results. An average weight reduction of 66% was achieved with the pre-leach process, which was conducted at 40° C. and with a residence time of 4 hrs. The elemental extraction results achieved with the leach are set forth in TABLE 5.

TABLE 5

Elemental Extractions

| Element | Recovery (%) |
|---------|--------------|
| Si | 0 |
| Al | 26 |
| Fe | 64 |
| Mg | 95 |
| Ca | 98 |
| Na | 16 |
| K | 18 |
| Ti | 0 |
| P | 89 |
| Mn | 98 |
| Ba | 0 |
| Sc | 69 |
| Sr | 93 |
| Nb | 0 |

Example 9

This example demonstrates the ability to regenerate the HCl used in the pre-leach process.

Synthetic solution and real pregnant leach solutions from the pre-leach testing described in EXAMPLE 8 were used in a series of acid regeneration tests, aimed at demonstrating the concept of hydrochloric acid regeneration and validating the theoretical mass balance calculations. Both the synthetic and real solution produced results in line with the theoretical calculations. It was found that over 80% of the consumed hydrochloric acid can be regenerated using sulfuric acid.

Example 10

This example demonstrates the ability to extract niobium, titanium and scandium values from the residues of the pre-leach testing described in EXAMPLE 8.

The residues from the pre-leach testing in EXAMPLE 8 were used in a series of acid bake tests, directed to extracting the niobium, titanium and remaining scandium after sulfation using sulfuric acid at high temperature in a kiln. Five acid bake tests were performed to confirm that the hydrochloric acid pre-leach residue would react similarly to the earlier sulfuric acid pre-leach residues. Twenty-four acid bake tests and seven strong acid agitated bake tests had previously been performed on the sulfuric acid pre-leach residues to evaluate various acid doses, bake times, bake temperature and variation in feed materials. It was determined that the hydrochloric acid pre-leach residue reacted in a similar manner to the previous sulfuric acid pre-leach residues.

The resulting acid bake residues were contacted with water in a series of water leach tests, aimed at solubilizing the sulfated niobium, titanium and scandium. Five water leach tests were performed to confirm that the hydrochloric acid pre-leach residue, while being significantly (66%) reduced in mass, would react similarly to the previous sulfuric acid pre-leach residues. Previously, 24 water leach tests used the sulfuric acid pre-leached acid bake residues, while seven more used strong acid agitated bake slurries. These earlier tests looked into a selection of water doses, leach times, and temperature. Tests were also performed on the sulfuric acid pre-leached residue produced in the sulfuric acid pre-leached acid bake pilot plant. A summary of the optimized conditions and elemental extraction for both the sulfuric acid and hydrochloric acid leach residues is set forth in TABLE 6 below.

TABLE 6

Acid Bake and Water Leach Extraction Results

| Description | Sulfuric Acid Pre-Leach Residue | Hydrochloric Acid Pre-Leach Residue | Unit |
|-------------|-------------------------------|-------------------------------------|------|
| AB Temperature | 300 | 300 | ° C. |
| AB Residence Time | 4 | 4 | Hours |
| AB Acid Ratio | 1.5 | 1.5 | t/t |
| WL Temperature | 90 | 95 | ° C. |
| WL Residence Time | 2 | 3' | Hours |
| WL Water Ratio | 1.0 | 1.0 | L/Kg |
| Si | 0 | 0 | % |
| Al | 23 | 34 | % |
| Fe | 99 | 100 | % |
| Mg | 97 | 100 | % |
| Ca | 95 | 100 | % |
| Na | 89 | 90 | % |
| K | 6 | 20 | % |
| Ti | 90 | 98 | % |
| P | 98 | 100 | % |
| Mn | 93 | 80 | % |
| Ba | 1 | 1 | % |
| Sc | 83 | 100 | % |
| Nb | 97 | 98 | % |

In the various embodiments described herein which utilize atmospheric pressure acid leaching, except as otherwise specified, various acids may be utilized for this purpose. Such acids include, but are not limited to, sulfuric acid and nitric acid. The leaching may be conducted in a suitable reaction vessel such as, for example, a vertical reactor. The reaction vessel may be equipped with a suitable stirring means such as, for example, an impeller or pump.

Except as otherwise indicated, various scandium-bearing feedstocks may be utilized in the systems and methodologies described herein. Thus, for example, such feedstocks may be obtained from a scandium laterite deposit, including the limonite, saprolite or bedrock fractions thereof. Also included are scandiferous nickel laterite deposits that can contain besides nickel and cobalt also appreciable amounts of scandium, such as between 30 and 100 ppm Sc. The feedstock may also be derived from numerous sources such as, for example, from other mineral recovery processes, or from the tailings or byproducts of other metal refining or processing operations. For example, the feedstock may be, or may be a derivative of, a lixiviant derived from leaching metal containing ores, solutions derived from the treatment of uranium tailings, waste solutions from titanium processing, or extracts from red mud. One skilled in the art will also appreciate that later portions of some of the processes described herein for extracting scandium from scandium laterite ores may be applied to the treatment of scandium solutions obtained by other means.

As noted above, some of the embodiments described herein for recovering scandium values rely in part on the use of ion exchange resins or solvent extraction. Suitable chemicals, resins, systems and methodologies which may be utilized for this purpose are described, for example, in commonly assigned U.S. 62/050,061 (Duyvesteyn), entitled "Systems and Methodologies for Recovering Scandium Values from Mixed Ion Solutions", which is incorporated herein by reference in its entirety.

Figure 12:
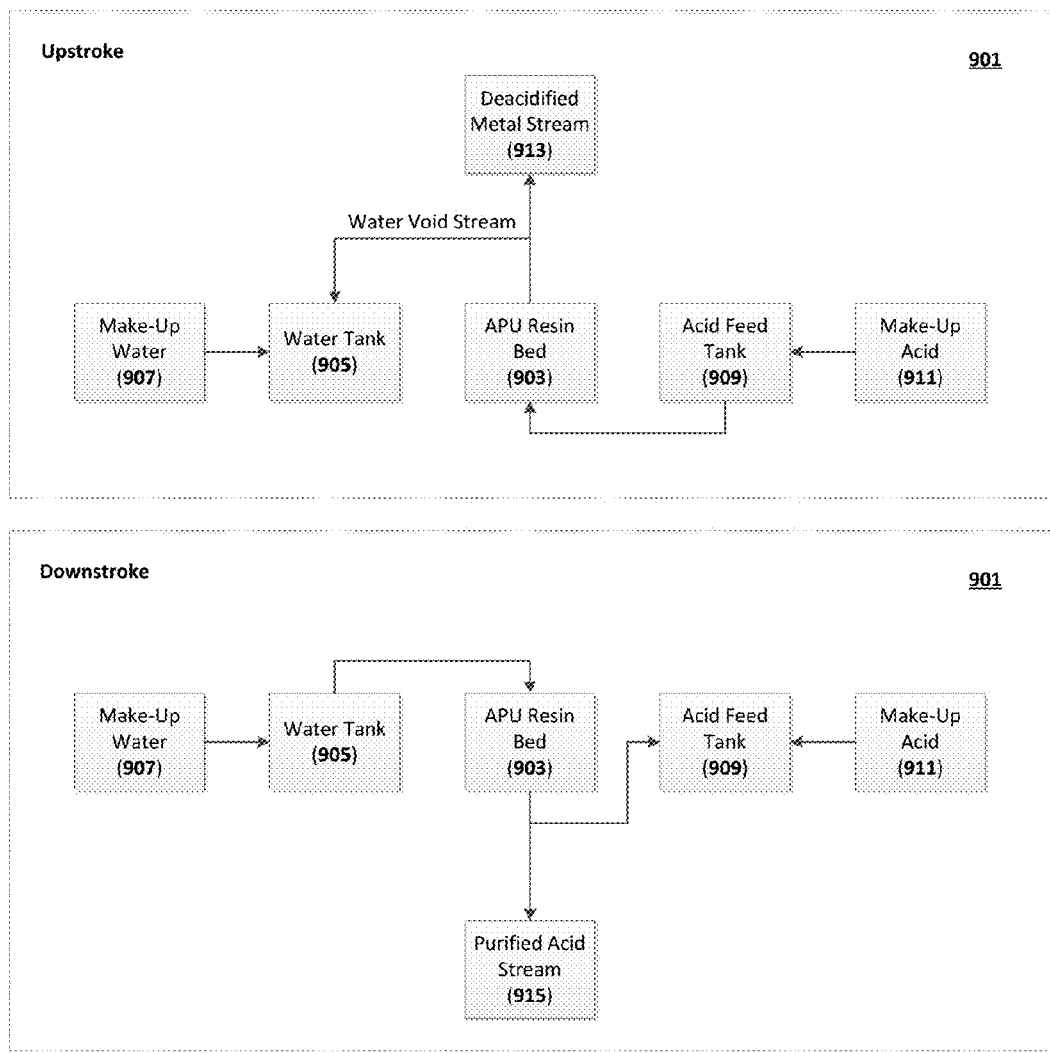
FIG. 12 is a flowchart illustrating the upstroke and downstroke of a typical acid retardation processing cycle.

As also noted above, some of the embodiments described herein for recovering scandium values rely in part on the use of acid retardation. Acid retardation makes use of an acid purification unit (APU), an example of which is depicted in FIG. 12. The APU 901 depicted therein comprises an APU resin bed 903, a water tank 905 with an associated make-up water supply 907, and an acid feed tank 909 with an associated make-up acid supply 911. The APU 901 has an operating cycle consisting of an upstroke and a downstroke.

During the upstroke of the operating cycle, a feed solution (which would typically be an acidic, scandium bearing solution in the systems and methodologies described herein) is pumped through the APU resin bed 903. The interstitial void volume in the APU resin bed 903 is initially filled with water from the previous operating cycle, which is displaced by the incoming feed solution. This water is transferred to the water tank 905 where it is used with additional make-up water during the subsequent downstroke of the operating cycle (described below).

The beads of the APU resin bed 903 comprise a material which has a chemical affinity for acids, and a chemical repulsion for metals. Consequently, as the feed solution passes through the resin bed, the acid is absorbed into the beads of the APU resin bed 903, and hence its progress through the resin bed is "retarded". Metal salts (including scandium salts) are rejected by the resin beads, and thus break through into the effluent or byproduct stream ahead of the acid. The upstroke is completed just as the acid begins to break through into the byproduct.

During the downstroke of the operating cycle, water is pumped from the water tank 905 downward through the APU resin bed 903. Initially, the APU resin bed 903 is filled with unseparated feed solution. This feed void is displaced by the incoming water back into the feed for processing during the next cycle. As the water continues to pass through the APU resin bed 903, the majority of the metal is displaced, and the purified acid removed during the upstroke is desorbed and collected in the acid feed tank 909.

It will be appreciated from the foregoing that repeated upstrokes and downstrokes yield a deacidified metal stream 913 and a purified acid stream 915. The purified acid stream 915 has a concentration which typically ranges anywhere from 50 to 110% of the feed value depending, for example, on the operating conditions and the feed concentration. By adjusting the volumes and flow rates of these process steps, it is possible to optimize APU performance to the process objectives. However, typical process capabilities range from 70 to 95% acid recovery and 50-90% metal recovery.

It will be appreciated from the foregoing that acid retardation may be used in some of the systems and methodologies described herein to produce first and second product solutions from a feed solution. The first product solution will be richer in metals (including scandium) compared to the second solution, and the second product solution will be richer in acid compared to the first solution. Consequently, acid retardation may be effectively utilized in these systems and methodologies to separate the acid and metal contents of a feed solution.

Figure 13:
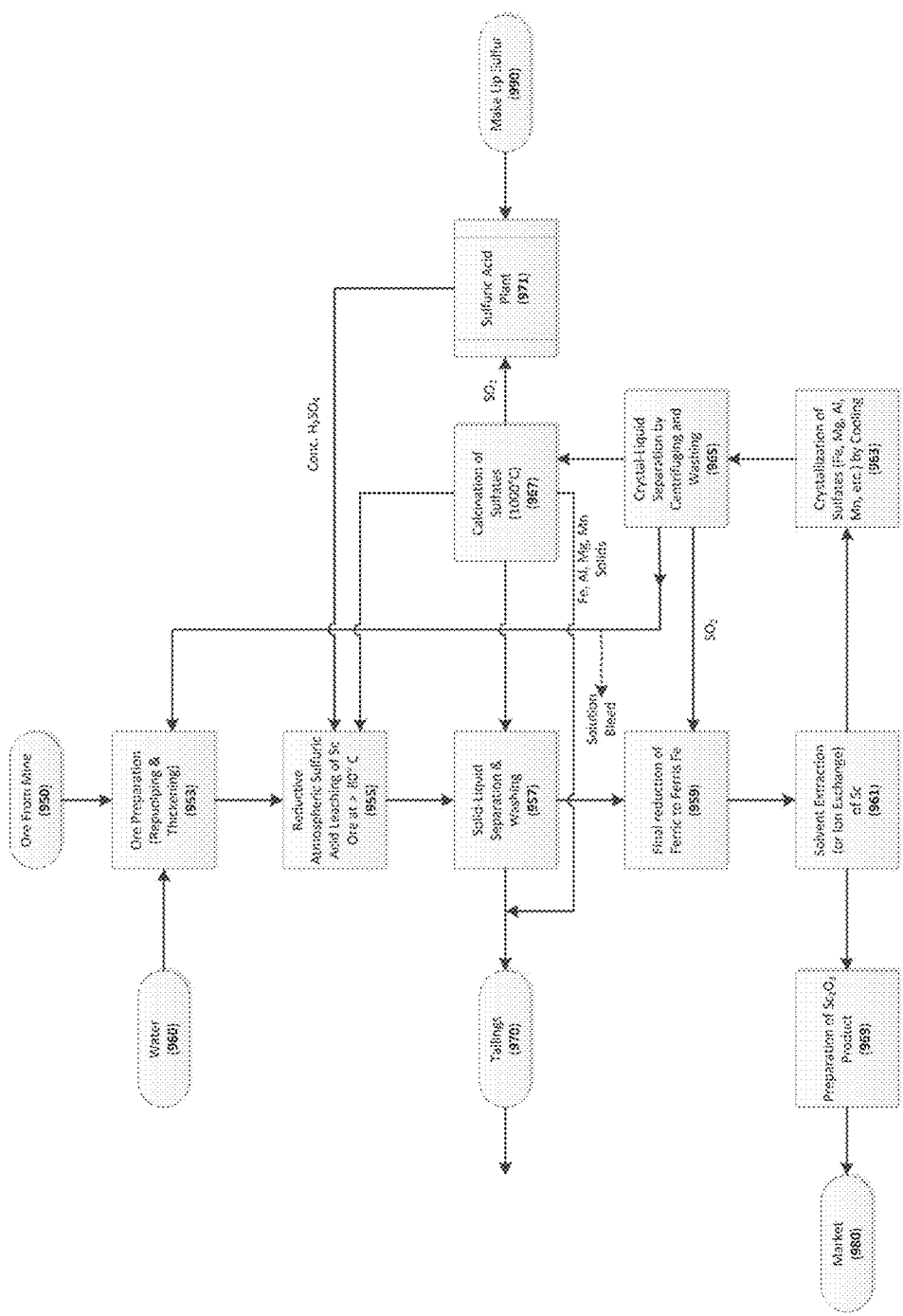
FIG. 13 is a flowchart of a process for recovering scandium values (as $Sc_2O_3$) in accordance with the teachings herein.

FIG. 13 depicts an eighth particular, non-limiting embodiment of a system (and underlying method) for recovering scandium from a scandium-bearing feedstock in accordance with the teachings herein. As seen therein, the system 951 utilizes as primary inputs an ore feedstock 950, make-up sulfur 990 and water 960, and generates scandium oxide ($Sc_2O_3$) 969 and tailings 970 as the primary outputs. Other products of the system 951 include sulfuric acid (generated by sulfuric acid plant 971) and $SO_2$, which are consumed in subsequent iterations of the process implemented by the system 951.

Referring still to FIG. 13, the process 951 commences with an ore feedstock 950, which is preferably a scandium-bearing laterite of the type described herein. It will be appreciated that the feedstock may be a product derived from a flotation process or other process of the type described herein which is geared towards separating scandium-containing components of an ore from scandium barren components of the ore. Use of such a feedstock avoids wasting processing resources on scandium-barren ore, reduces the cost per unit scandium that is recovered by the process, and improves the economic feasibility of the process 951.

The ore is subjected to an ore preparation process 953, which may involve re-pulping or thickening of the feedstock. This step commonly involves the addition of water 960 to the feedstock.

After preparation, the ore is subjected to reductive atmospheric sulfuric acid leaching 955. This leaching process is a sulfate-based atmospheric leaching process in which the primary reagents (e.g., $H_2SO_4$ and $SO_2$) are preferably regenerated from intermediate by-products of thermal decomposition, as described in greater detail below. In particular, subsequent to the reductive atmospheric sulfuric acid leaching 955, the resulting mixture is subjected to solid-liquid separation and washing 957, which yields tailings 970 and a leachate. The tailings are then either disposed of through means well known to the art, or are subjected to further processing steps to recover further metal values therefrom.

The leachate is then treated with $SO_2$ to reduce 959 the ferric ions ($Fe^{3+}$) therein to ferrous ions ($Fe^{2+}$). The treated solution is then subjected to a suitable scandium extraction technique 961, such as solvent extraction or ion exchange, to extract scandium values therefrom, typically as $Sc_2O_3$. Various metal sulfates are yielded as byproducts of this process. The $Sc_2O_3$ is then subjected to suitable preparation 969, such as additional steps to increase the purity and/or concentration of the $Sc_2O_3$ solution, after which the purified $Sc_2O_3$ product is distributed to market 980.

Meanwhile, the metal sulfates yielded as byproducts of the scandium extraction technique 961 are subjected to crystallization 963, a process which will typically involve cooling solutions of these sulfates. The crystallized sulfates are then separated from solution through centrifuging and washing 965. This process generates $SO_2$ as a byproduct, which may be utilized in subsequent iterations of the ferric to ferrous reduction process 959. The liquid component generated by this process may similarly be used in subsequent iterations of the ore preparation process 953, possibly with a portion of the solution being removed by solution bleed.

The crystallized sulfates separated from solution through the centrifuging and washing 965 step are then subjected to calcination 967. The calcination step 967 generates $SO_2$, which is used by the sulfuric acid plant 971 to generate concentrated sulfuric acid, possibly through the addition of make-up sulfur 990. As noted above, the concentrated sulfuric acid generated by the sulfuric acid plant 971 is utilized in subsequent iterations of the reductive atmospheric sulfuric acid leaching 955 step. Meanwhile, the Fe, Al, Mg and Mn solids resulting from the calcination step 967 are combined with the tailings 970 resulting from the solid-liquid separation and washing 957 step.

Figure 14:
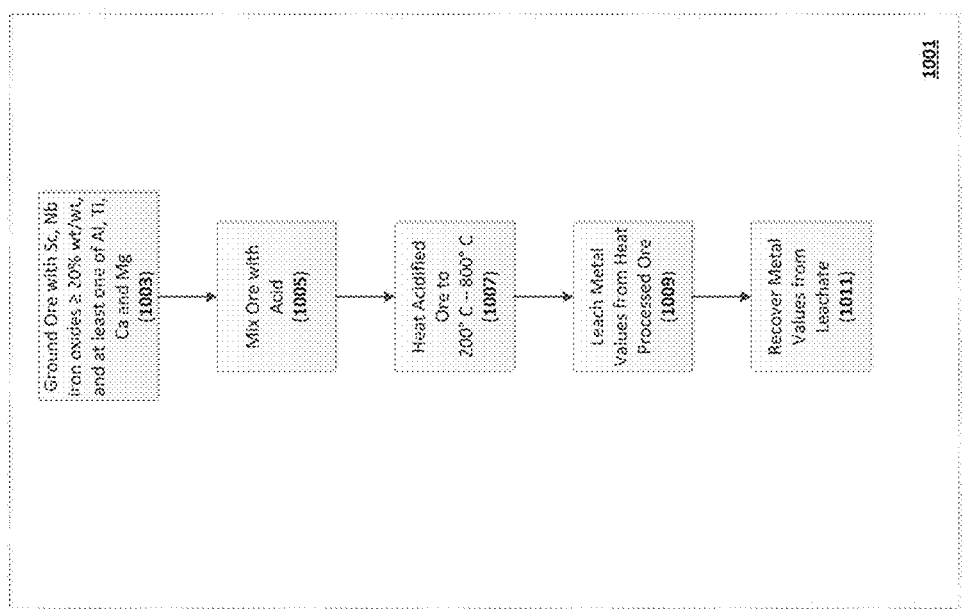
FIG. 14 is a flow chart illustrating an embodiment of a process for recovering scandium, niobium and titanium from a ground ore feedstock in accordance with the teachings herein.

FIG. 14 depicts another particular, non-limiting embodiment of a method 1001 for recovering scandium from a scandium-bearing feedstock in accordance with the teachings herein. In the particular embodiment depicted, the scandium-bearing feedstock is provided 1003 in the form of a ground ore which contains scandium, niobium, iron oxides, and at least one metal selected from the group consisting of aluminum, titanium, calcium and magnesium, wherein the amount of iron oxides in the ground ore is at least 20% wt/wt. It is desirable in this embodiment to recover at least the scandium, niobium and titanium values from the ore feedstock, though not necessarily at the same time.

Preferably, the number of moles of Sc, Nb, Fe, Al, Ti, Ca and Mg present in the ore are $m_{Sc}$, $m_{Nb}$, $m_{Fe}$, $m_{Al}$, $m_{Ti}$, $m_{Ca}$ and $m_{Mg}$, respectively. If the acid used to obtain the acidified ore is nitric acid, then the step of mixing the portion of ore with an acid includes mixing the portion of ore with $m_{HNO3}$ moles of nitric acid such that $k \leq 6m_{HNO3} < k+2m_{Fe}+2m_{Al}+3m_{Mg}$, wherein $k=2m_{Sc}+2m_{Nb}+2m_{Ti}+3m_{Ca}$, thereby obtaining the acidified ore. If the acid used to obtain the acidified ore is sulfuric acid, then the step of mixing the portion of ore with an acid includes mixing the portion of ore with $M_{H2SO4}$ moles of sulfuric acid such that $k \leq 3m_{H2SO4} < k+2m_{Fe}+2m_m+3m_{Mg}$, wherein $k=2m_{Sc}+2m_{Nb}, +2m_{Ti}+3m_{Ca}$, thereby obtaining an acidified ore.

The ground ore is mixed 1005 with a suitable acid such as, for example, sulfuric acid, nitric acid or hydrochloric acid, thus yielding an acidified ore. Notably, however, the amount of acid utilized, though stoichiometrically sufficient to react with the scandium, niobium, titanium and calcium oxides in the ore, is not stoichiometrically sufficient to react with all of the metal oxides in the ore. In a preferred embodiment, the ground ore is mixed with acid at an acid ratio within the range of 1.25 to 3.0. Preferably, treatment of the ore with acid occurs under conditions which cause scandium to be released from the crystal structure of the ore.

The acidified ore is then heated 1007 to obtain a heat processed ore. This heating preferably occurs in a reactor at a temperature which is typically within the range of about 200° C. to about 800° C., preferably within the range of about 450° C. to about 800° C., more preferably within the range of about 700° C. to about 800° C., and most preferably within the range of about 750° C. to about 800° C. The duration of heating may vary, but is preferably in the range of 2 to 4 hours. In some embodiments, this heating preferably occurs under conditions in which K-jarosite is unstable.

Preferably, the step of mixing 1005 the ore with acid results in the formation of an iron salt of the acid, and the step of heating 1007 the acidified ore thermally decomposes the iron salt, preferably resulting in the formation of an iron oxide. For example, if sulfuric acid is utilized in the mixing 1005 step, then the thermal decomposition of the iron salt may evolve $SO_2$ from the ore. Similarly, if nitric acid is utilized in the mixing 1005 step, then the thermal decomposition of the iron salt may evolve $NO_2$ from the ore. In some embodiments, the evolved $SO_2$ or $NO_2$ may be collected (for example, with a scrubber) and utilized to generate the corresponding acid for use in a subsequent iteration of the process.

The scandium, niobium and titanium values are then leached 1009 from the heat processed ore with water, thereby obtaining a leachate. Preferably, the aforementioned metal values are leached simultaneously from the heat processed ore, although it will be appreciated that embodiments are also possible in which these metal values are leached separately from each other, in whole or in part. The metal values may be leached from the heat processed ore as their corresponding acid salts. In some embodiments, the leachate may contain $Sc_2O_3$.

During leaching, the pH of the leaching solution is preferably maintained at a value greater than 2.5, more preferably greater than 3.0, and most preferably greater than 3.5. During leaching, the redox potential of the leaching solution is typically maintained outside of the range of about 0.9 to about 1.0, preferably outside of the range of about 0.8 to about 1.1, more preferably outside of the range of about 0.75 to about 1.15, and most preferably outside of the range of about 0.7 to about 1.2.

The scandium, niobium and titanium values are then recovered 1011 from the leachate. Typically, these values will be recovered separately from each other, although embodiments are also possible in which two or more of these metal values are recovered together. In the latter case, the combined metal values may be separated later, or may be further processed or marketed as a mixture.

In some embodiments of the foregoing method, the leach solution may contain undissolved solids. In such embodiments, recovering scandium, niobium and titanium values from the leachate may include separating the leach solution from the undissolved solids, thereby obtaining a separated leach solution, and processing the separated leach solution for the recovery of scandium, niobium and titanium values.

In some embodiments of the foregoing method, the step of mixing the portion of ore with an acid may include producing a slurry from the ground ore feedstock, and subjecting the slurry to froth flotation, thereby obtaining a flotation concentrate. The flotation concentrate may be treated with an acid to obtain an acidified concentrate. The acidified concentrate may then be baked, and metal values (such as, for example, scandium and niobium values) may then be leached from the baked ore. Such leaching may occur, for example, in a stirred reactor, and is preferably implemented using an acid/solvent ratio of at least 2.0 t/t.

Figure 15:
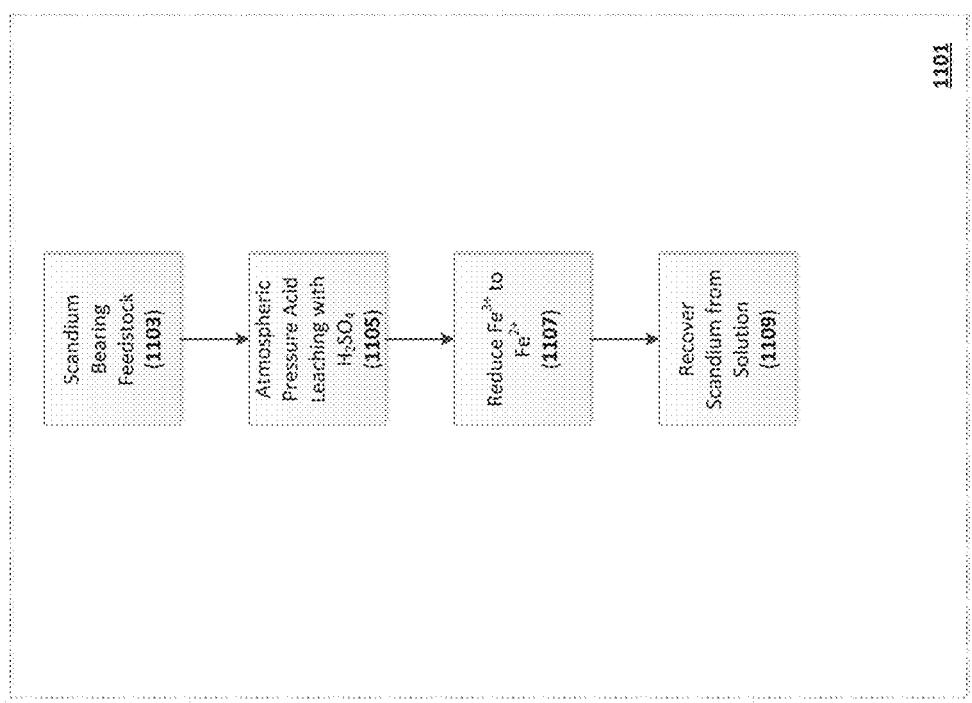
FIG. 15 is a flow chart illustrating an embodiment of an atmospheric pressure acid leaching process in accordance with the teachings herein.

FIG. 15 depicts another particular, non-limiting embodiment of a method 1101 for recovering scandium from a scandium-bearing feedstock in accordance with the teachings herein. In the particular embodiment depicted, a scandium-bearing ore feedstock 1103 is provided. The feedstock may be a scandium laterite ore, or any other scandium-containing feedstock of the type disclosed herein.

The ore feedstock is then subjected to atmospheric pressure acid leaching 1105, thereby producing a first scandium-bearing solution containing ferric ($Fe^{3+}$) ions. The atmospheric pressure acid leaching 1105 step is preferably conducted with sulfuric acid, although other suitable acids may also be utilized. In some embodiments, this process may yield solid and liquid components, and the process may further include separating at least a portion of the solid component from the liquid component prior to further processing.

At least a portion of the ferric ($Fe^{3+}$) ions are then reduced 1107 to ferrous ($Fe^{2+}$) ions by treating the first solution with $SO_2$, thereby obtaining a second scandium-bearing solution.

Scandium values are then recovered from the second solution (and preferably in the form of $Sc_2O_3$) as, for example, through solvent extraction or an ion exchange process. In some embodiments, this process yields a scandium-barren solution which contains metal sulfites. The metal sulfites may then be recovered from the scandium-barren solution as, for example, by crystallizing the metal sulfites (this may be achieved by cooling the solution). In some embodiments, recovery of the metal sulfites from the scandium-barren solution may be achieved by processing the solution in a centrifuge, and optionally washing the resulting precipitate. In some embodiments, the process of recovering metal sulfites from the scandium-barren solution may evolve $SO_2$, which may be captured and used in the reduction step of a further iteration of the process.

In some embodiments of the processes described herein, ore feeds subjected to acid baking may first be subject to a pretreatment process whereby the mostly barren carbonate components in the ore are removed. This may occur, for example, through the use of a flotation using standard calcite/dolomite fatty acid flotation, or by leaching of the carbonate with hydrochloric acid or nitric acid. In a separate unit operation, the calcium chloride/nitrate solution generated by such a treatment may be subsequently treated with sulfuric acid to precipitate gypsum, thereby recycling the hydrochloric/nitric acid back to the leaching process.

Unless otherwise indicated, various acids may be utilized in the processes described herein. These include, without limitation, sulfuric acid, nitric acid and hydrochloric acid. In some embodiments, acid may be generated in situ as, for example, through the addition of $SO_2$ to an aqueous solution.

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims. In these claims, absent an explicit teaching otherwise, any limitation (or limitations) in any dependent claim may be combined with any limitation (or limitations) in any other dependent claim (or claims) without departing from the scope of the invention, even if such a combination is not explicitly set forth in any of the following claims.

What is claimed is:

1. A method for recovering scandium values from laterite ores, comprising:
    providing a scandium-bearing ore from an ore formation containing a limonite fraction, a saprolite fraction and a bedrock fraction, wherein said limonite fraction includes kaolinite and goethite phases, and wherein the goethite phase is a scandium-bearing phase;
    separating the limonite fraction from the saprolite fraction and the bedrock fraction, thereby producing a separated limonite fraction;
    subjecting the separated limonite fraction to atmospheric pressure acid leaching, thereby producing a first scandium-bearing, acidic solution;
    increasing the pH of the first solution to produce a second, scandium-bearing solution; and
    recovering scandium values from the second solution;
    wherein increasing the pH of the first solution to produce a second, scandium-bearing solution involves adding a portion of the saprolite fraction or the bedrock fraction to the first solution.

2. The method of claim 1, wherein increasing the pH of the first solution to produce a second, scandium-bearing solution involves adding lime to the first solution.

3. The method of claim 1, wherein increasing the pH of the first solution to produce a second, scandium-bearing solution involves adding a portion of the saprolite fraction to the first solution.

4. The method of claim 3, wherein the saprolite fraction is scandium-bearing, and wherein the concentration of scandium in the second solution is greater than the concentration of scandium in the first solution.

5. The method of claim 3, wherein the saprolite fraction is scandium-bearing, and wherein adding a portion of the saprolite fraction to the first solution results in the extraction of scandium from the saprolite fraction.

6. The method of claim 1, wherein increasing the pH of the first solution to produce a second, scandium-bearing solution involves adding a portion of the bedrock fraction to the first solution.

7. The method of claim 3, wherein the bedrock fraction is scandium-bearing, and wherein the concentration of scandium in the second solution is greater than the concentration of scandium in the first solution.

8. The method of claim 7, wherein the bedrock fraction is scandium-bearing, and wherein adding a portion of the bedrock fraction to the first solution results in the extraction of scandium from the bedrock fraction.

9. The method of claim 1, wherein the kaolinite phase is a scandium-barren phase.

10. The method of claim 1, wherein the pH of the second solution is no greater than 3.5.

11. The method of claim 1, further comprising:
    forming an Fe-containing precipitate from the first solution.

12. The method of claim 11, wherein the Fe-containing precipitate is formed through the production of jarosite in the first solution.

13. The method of claim 11, wherein the Fe-containing precipitate is formed through the production of goethite in the first solution.

14. The method of claim 11, wherein the Fe-containing precipitate is formed through the production of jarosite and goethite in the first solution.

15. The method of claim 11, wherein the Fe-containing precipitate is formed by the hydrothermal processing of the first or second solution.

16. The method of claim 15, wherein the Fe-containing precipitate comprises a material selected from the group consisting of hematite and basic iron sulfates.

17. The method of claim 15, wherein the hydrothermal processing is conducted in an autoclave.

18. The method of claim 1, further comprising:
    subjecting the first solution to an ion exchange process which produces a first stream enriched in scandium compared to the first solution, and a second stream enriched in acid compared to the first solution.

19. The method of claim 18, wherein the second stream obtained in a first iteration of the method is used in the step of subjecting the separated limonite fraction to atmospheric pressure acid leaching in a second iteration of the method.

20. The method of claim 1, further comprising:
    subjecting the first solution to an acid retardation process which produces first and second streams, wherein the first stream is enriched in scandium compared to the second stream, wherein the second stream is enriched in acid compared to the first stream, and wherein the second stream obtained in a first iteration of the method is used in the step of subjecting the separated limonite fraction to atmospheric pressure acid leaching in a second iteration of the method.

21. The method of claim 1, wherein said atmospheric pressure acid leaching includes treatment of the separated limonite fraction with sulfuric acid.

22. The method of claim 21, further comprising:
forming an Fe-containing precipitate from the first solution, wherein the Fe-containing precipitate comprises rhomboclase.

23. The method of claim 21, further comprising:
precipitating rhomboclase from the first solution.

24. The method of claim 23, wherein rhomboclase is precipitated by the addition of acid to the first solution.

25. The method of claim 23, wherein rhomboclase is precipitated by the addition of sulfuric acid to the first solution.

26. The method of claim 25, wherein the first solution is a ferric iron solution.

27. The method of claim 1, further comprising:
subjecting the first solution to a solvent extraction process which produces a first stream enriched in scandium compared to the first solution, and a second stream enriched in acid compared to the first solution.

28. The method of claim 27, wherein the second stream obtained in a first iteration of the method is used in the step of subjecting the separated limonite fraction to atmospheric pressure acid leaching in a second iteration of the method.

\* \* \* \* \*